(12) United States Patent
Kuo

(10) Patent No.: US 11,125,979 B2
(45) Date of Patent: Sep. 21, 2021

(54) OPTICAL PHOTOGRAPHING LENS ASSEMBLY COMPRISING A COMPONENT OF VARIABLE REFRACTIVE POWERS, IMAGE CAPTURING UNIT AND ELECTRONIC DEVICE

(71) Applicant: LARGAN PRECISION CO., LTD., Taichung (TW)

(72) Inventor: Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 141 days.

(21) Appl. No.: 16/596,530

(22) Filed: Oct. 8, 2019

(65) Prior Publication Data
US 2021/0048629 A1 Feb. 18, 2021

(30) Foreign Application Priority Data
Aug. 14, 2019 (TW) .................. 108128930

(51) Int. Cl.
| G02B 13/00 | (2006.01) |
| G02B 3/14 | (2006.01) |
| G02B 7/09 | (2021.01) |
| G02B 9/64 | (2006.01) |

(52) U.S. Cl.
CPC ........... *G02B 13/0045* (2013.01); *G02B 3/14* (2013.01); *G02B 7/09* (2013.01); *G02B 9/64* (2013.01)

(58) Field of Classification Search
CPC ........ G02B 13/0045; G02B 3/14; G02B 7/09; G02B 9/64; G02B 26/004; G02B 15/14
See application file for complete search history.

(56) References Cited

U.S. PATENT DOCUMENTS

| 10,175,456 B2 | 1/2019 | Wu et al. |
| 10,175,493 B1 | 1/2019 | Chen et al. |
| 2015/0285962 A1 | 10/2015 | Phair et al. |
| 2016/0033690 A1 | 2/2016 | Henriksen |
| 2016/0363742 A1 | 12/2016 | Ohno |
| 2017/0160442 A1 | 6/2017 | Phair et al. |
| 2017/0054883 A1 | 12/2017 | Sharma et al. |
| 2018/0275320 A1 | 9/2018 | Hsieh et al. |
| 2019/0158750 A1 | 5/2019 | Kim et al. |
| 2019/0170914 A1 | 6/2019 | Fuller et al. |

FOREIGN PATENT DOCUMENTS

| CN | 107065152 A | 8/2017 |
| CN | 207318763 U | 5/2018 |
| CN | 207502823 U | 6/2018 |
| CN | 207718066 U | 8/2018 |

(Continued)

*Primary Examiner* — Wen Huang
(74) *Attorney, Agent, or Firm* — Maschoff Brennan

(57) ABSTRACT

An optical photographing lens assembly includes a focus tunable component and an imaging lens system. The imaging lens system includes, in order from an object side to an image side, a first lens group and a second lens group. The first lens group includes, in order from the object side to the image side, an object-side first lens element and an object-side second lens element. The second lens group includes, in order from the image side to the object side, an image-side first lens element and an image-side second lens element. At least one lens surface of at least one lens element in the imaging lens system is aspheric and has at least one inflection point. The imaging lens system has a total of at least four lens elements.

24 Claims, 14 Drawing Sheets

(56) References Cited

FOREIGN PATENT DOCUMENTS

| | | |
|---|---|---|
| CN | 108490631 A | 9/2018 |
| CN | 108508622 A | 9/2018 |
| CN | 108803016 A | 11/2018 |
| CN | 109471251 A | 3/2019 |
| CN | 109782380 A | 5/2019 |
| CN | 109782423 A | 5/2019 |
| CN | 109782519 A | 5/2019 |
| CN | 109870750 A | 6/2019 |
| CN | 109870865 A | 6/2019 |
| CN | 109884778 A | 6/2019 |
| CN | 209167649 U | 7/2019 |
| CN | 209215612 U | 8/2019 |
| CN | 209215712 U | 8/2019 |
| CN | 110221418 A | 9/2019 |
| KR | 100835108 B1 | 6/2008 |
| WO | 2019002509 A | 1/2019 |
| WO | 2019/205789 A1 | 10/2019 |
| WO | 2020/039047 A1 | 2/2020 |
| WO | 2020122594 A | 6/2020 |
| WO | 2020145637 A | 7/2020 |

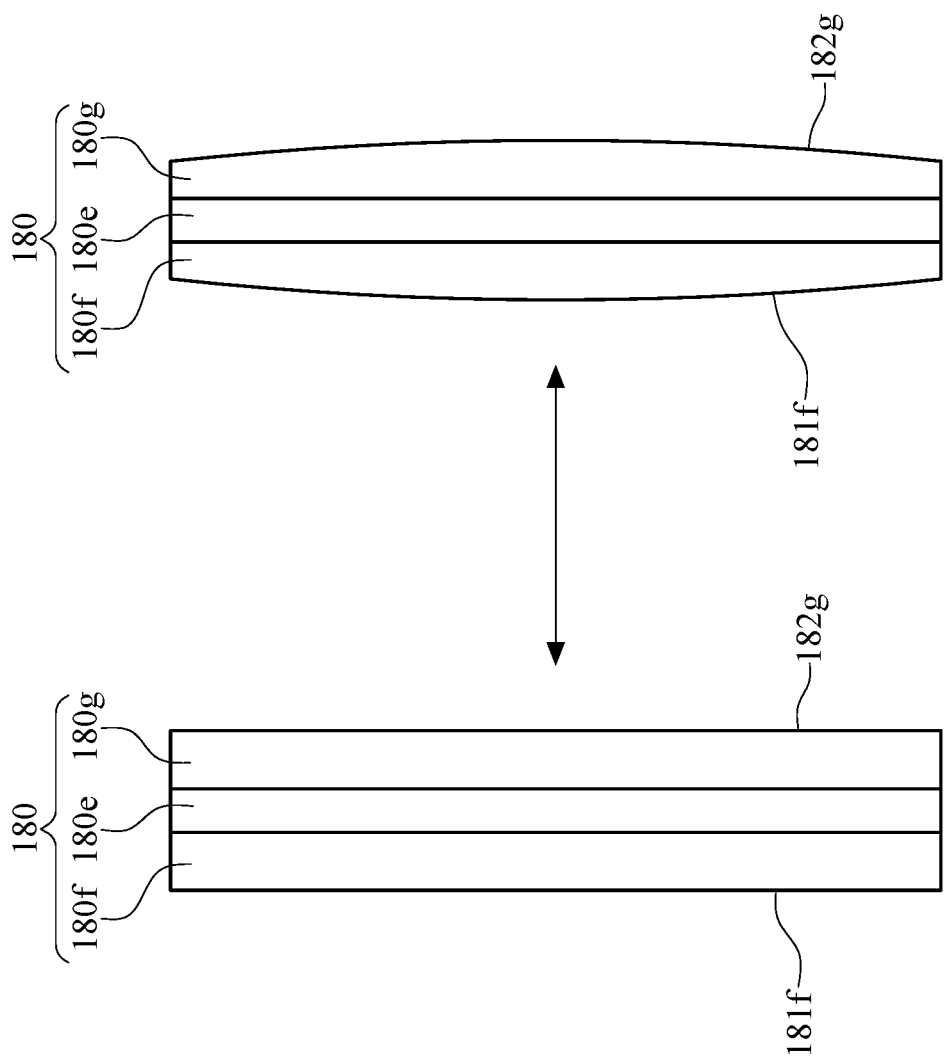

OPTICAL PHOTOGRAPHING LENS ASSEMBLY COMPRISING A COMPONENT OF VARIABLE REFRACTIVE POWERS, IMAGE CAPTURING UNIT AND ELECTRONIC DEVICE

RELATED APPLICATIONS

This application claims priority to Taiwan Application 108128930, filed on Aug. 14, 2019, which is incorporated by reference herein in its entirety.

BACKGROUND

Technical Field

The present disclosure relates to an optical photographing lens assembly, an image capturing unit and an electronic device, more particularly to an optical photographing lens assembly and an image capturing unit applicable to an electronic device.

Description of Related Art

With the development of technology, photographing modules have been widely used in various fields, and photographing modules featuring optical zoom are even more widely and flexibly used in various applications. Conventionally, the photographing modules usually achieve auto-focusing effect by moving the lens elements thereof. However, due to physical structure limitations, the size of the photographing modules is difficult to be reduced, the image quality of the modules is limited, and it always comes with complex assembly processes. Although recently developed multi-lens optical zoom technology improves the image quality, it is still a big challenge to reduce the assembly complexity, reduce the module size and achieve a higher zoom ratio.

SUMMARY

According to one aspect of the present disclosure, an optical photographing lens assembly includes a focus tunable component and an imaging lens system. The imaging lens system includes, in order from an object side to an image side, a first lens group and a second lens group. The first lens group includes, in order from the object side to the image side, an object-side first lens element and an object-side second lens element. The second lens group includes, in order from the image side to the object side, an image-side first lens element and an image-side second lens element. Each of all lens elements in the imaging lens system has an object-side surface facing toward the object side and an image-side surface facing toward the image side.

At least one lens surface of at least one lens element in the imaging lens system is aspheric and has at least one inflection point. The imaging lens system has a total of at least four lens elements. The lens elements of the first lens group are closer to the object side than other lens elements in the imaging lens system, and the lens elements of the second lens group are closer to the image side than other lens elements in the imaging lens system.

When a maximum focal length of the optical photographing lens assembly is fmax, and a minimum focal length of the optical photographing lens assembly is fmin, the following condition is satisfied:

$1.15 < fmax/fmin.$

According to another aspect of the present disclosure, an optical photographing lens assembly includes a focus tunable component and an imaging lens system. The focus tunable component includes at least one liquid lens set, and the at least one liquid lens set includes at least two liquid materials and at least one transparent substrate. The imaging lens system includes, in order from an object side to an image side, a first lens group and a second lens group. The first lens group includes, in order from the object side to the image side, an object-side first lens element and an object-side second lens element. The second lens group includes, in order from the image side to the object side, an image-side first lens element and an image-side second lens element. Each of all lens elements in the imaging lens system has an object-side surface facing toward the object side and an image-side surface facing toward the image side.

At least one lens surface of at least one lens element in the imaging lens system is aspheric and has at least one inflection point. The imaging lens system has a total of at least four lens elements. The lens elements of the first lens group are closer to the object side than other lens elements in the imaging lens system, and the lens elements of the second lens group are closer to the image side than other lens elements in the imaging lens system.

In at least one mode of the optical photographing lens assembly, when an f-number of the optical photographing lens assembly is Fno, the following condition is satisfied:

$0.50 < Fno < 2.5.$

According to another aspect of the present disclosure, an image capturing unit includes one of the aforementioned optical photographing lens assemblies and an image sensor, wherein the image sensor is disposed on an image surface of the optical photographing lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows:

FIG. 16 is a schematic view of the focus tunable component in Mode 1 and Mode 2 according to the 1st embodiment of the present disclosure.

DETAILED DESCRIPTION

Figure 1:
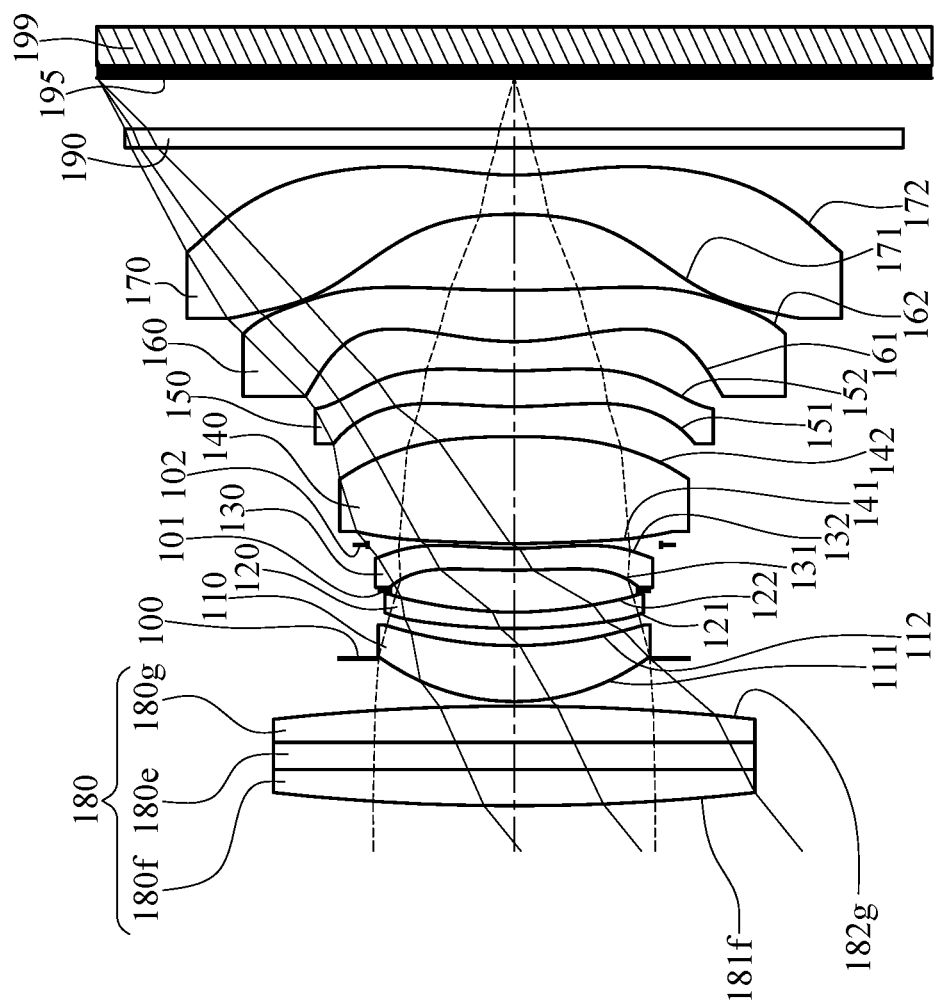
FIG. 1 is a schematic view of an image capturing unit in Mode 2 according to the 1st embodiment of the present disclosure.

An optical photographing lens assembly of the present disclosure includes a focus tunable component and an imaging lens system. The focal length of the optical photographing lens assembly can be changed in accordance with various conditions (e.g., object distances or ambient temperatures). In specific, the focal length of the optical photographing lens assembly is adjustable by the action of the focus tunable component to achieve optical zoom functionality, so that the images of captured scenes can be accurately and clearly focused on the image senor of the image capturing unit including the optical photographing lens assembly. As such, optical zoom can be achieved by one single lens having limited accommodation space. Furthermore, the optical photographing lens assembly can also achieve optical zoom in collaboration with other focus tuning or zooming methods. For example, the optical photographing lens assembly can be used in multi-lens system so as to achieve a higher zoom ratio, to reduce the number of lenses to miniaturize the device size in the same zoom ratio condition, or to make the optical zoom process smoother. In addition, the focus tunable component can include a liquid lens set, a liquid crystal lens set, a positive lens element, a negative lens element or other optical components featuring focus tuning function, and the focus tunable component can change the focal length of the optical photographing lens assembly by an external control unit (e.g., circuit or mechanical stress control mechanism) so as to achieve optical zoom, compact module, short-object-distance auto focus or optical image stabilization, and it is favorable for easy assembly.

According to the present disclosure, the focus tunable component can include at least one liquid lens set, and the at least one liquid lens set can include at least one liquid material and at least one transparent substrate. Therefore, using liquid lens elements is favorable for providing easy assembly and increasing zooming response efficiency. Moreover, the at least one liquid lens set can include at least two liquid materials and at least one transparent substrate. Therefore, the configuration is favorable for reducing aberrations, such as spherical aberration, generated by the liquid lens set during the optical zoom process, and it is also favorable for reducing sensitivity. Moreover, the focus tunable component can be located on the object side of the imaging lens system; that is, the focus tunable component can be located between an imaged object and the imaging lens system. Therefore, it is favorable for easy assembly.

Moreover, the at least two liquid materials can include a first liquid material and a second liquid material, and the first liquid material and the second liquid material can be of the same material. Therefore, using the same material is favorable for reducing manufacturing costs. However, the present disclosure is not limited thereto. According to actual requirements, the first liquid material and the second liquid material can be of different materials.

In the interest of better clarity and conciseness, hereinafter, the imaging lens system includes, in order from an object side to an image side, a first lens group and a second lens group. The first lens group includes, in order from the object side to the image side, an object-side first lens element and an object-side second lens element. The second lens group includes, in order from the image side to the object side (i.e., opposite to a direction from the object side to the image side), an image-side first lens element and an image-side second lens element. Each of all lens elements in the imaging lens system has an object-side surface facing toward the object side and an image-side surface facing toward the image side. Additionally, the lens elements of the first lens group are closer to the object side than the other lens elements in the imaging lens system are to the object side, and the lens elements of the second lens group are closer to the image side than the other lens elements in the imaging lens system are to the image side. That is, the object-side first lens element and the object-side second lens element of the first lens group are two lens elements closest to the object side in the imaging lens system, and the image-side first lens element and the image-side second lens element of the second lens group are two lens elements closest to the image side in the imaging lens system. Furthermore, an object-side i-th lens element is an i-th lens element counting from the object side to the image side in the imaging lens system, and an image-side j-th lens element is a j-th lens element counting from the image side to the object side in the imaging lens system. For example, in the case of the imaging lens system having a total of five lens elements, an object-side first lens element is an image-side fifth lens element, and an object-side second lens element is an image-side fourth lens element. Other cases where the imaging lens system has four lens elements in total or more than five lens elements in total can be deduced in the same manner.

According to the present disclosure, the imaging lens system has a total of at least four lens elements. Therefore, it is favorable for the imaging lens system to have a sufficient number of lens elements to correct aberrations, thereby providing high image quality. Moreover, the imaging lens system can have a total of at least five lens elements. Moreover, the imaging lens system can have a total of at least six lens elements. Moreover, the imaging lens system can have a total of at least seven lens elements.

At least one of the object-side surface and the image-side surface of at least one lens element in the imaging lens system is aspheric and has at least one inflection point. Therefore, it is favorable for increasing the shape variation of the lens surface(s) so as to reduce the size and improve image quality of the optical photographing lens assembly. Moreover, at least one of the object-side surface and the image-side surface of each of at least two lens elements in the imaging lens system can be aspheric and have at least one inflection point. Moreover, at least one of the object-side surface and the image-side surface of each of at least three lens elements in the imaging lens system can be aspheric and have at least one inflection point. Moreover, at least one of the object-side surface and the image-side surface of each of at least four lens elements in the imaging lens system can be aspheric and have at least one inflection point. Moreover, at least one of the object-side surface and the image-side surface of at least one lens element of the second lens group can be aspheric and have at least one inflection point. Therefore, lens element(s) at the image side of the imaging lens system having one or more inflection points is favorable for improving peripheral image quality and miniaturizing the size of the image side of the imaging lens system. Moreover, at least one of the object-side surface and the image-side surface of each of at least two lens elements of the second lens group can be aspheric and have at least one inflection point. In some configurations, the imaging lens system can have a total of five or more lens elements, and the second lens group can include three or more lens elements closest to the image side in the imaging lens system. Moreover, at least one of the object-side surface and the image-side surface of each of at least three lens elements of the second lens group can be aspheric and have at least one inflection point. Moreover, at least one of the object-side surface and the image-side surface of each of at least four lens elements of the second lens group can be aspheric and have at least one inflection point. Moreover, each of the object-side surface and the image-side surface of any lens element in the imaging lens system can be aspheric and have at least one inflection point. Therefore, it is favorable for adjusting the shape of lens surfaces so as to further correct aberrations. Please refer to FIG. 10, which shows inflection points P of the first lens element 110, the third lens element 130, the fourth lens element 140, the fifth lens element 150, the sixth lens element 160 and the seventh lens element 170 according to Mode 2 of the 1st embodiment of the present disclosure, wherein the first lens element 110 is the object-side first lens element, the second lens element 120 is the object-side second lens element, the sixth lens element 160 is the image-side second lens element, and the seventh lens element 170 is the image-side first lens element.

The object-side first lens element can have positive refractive power. Therefore, it is favorable for adjusting the field of view and reducing the size of the imaging lens system. The object-side surface of the object-side first lens element can be convex in a paraxial region thereof. Therefore, it is favorable for light to travel in the imaging lens system evenly.

The object-side second lens element can have negative refractive power. Therefore, it is favorable for correcting aberrations such as spherical aberration generated due to the miniaturization of the imaging lens system.

The image-side first lens element can have negative refractive power. Therefore, it is favorable for balancing the refractive power distribution at the image side of the imaging lens system so as to correct aberrations, and also favorable for adjusting the back focal length. The image-side surface of the image-side first lens element can be concave in a paraxial region thereof. Therefore, it is favorable for adjusting the surface shape of the image-side first lens element so as to adjust the refractive power thereof and correct off-axis aberrations.

Figure 10:
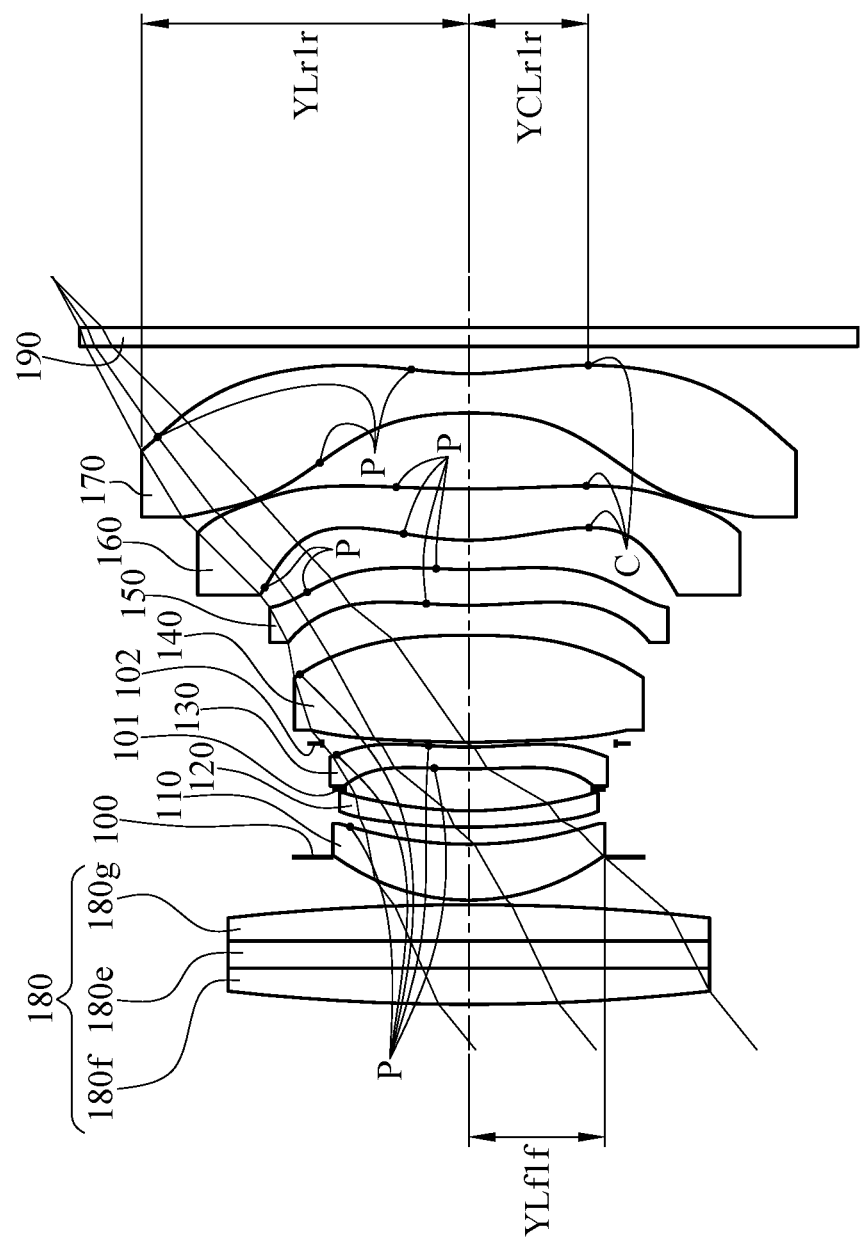
FIG. 10 shows a schematic view of YLf1f, YLr1r and YCLr1r as well as several inflection points and critical points according to Mode 2 of the 1st embodiment of the present disclosure.

The image-side second lens element can have at least one critical point in an off-axis region thereof. Therefore, it is favorable for correcting aberrations on the periphery of the image surface and adjusting the outer diameter of the image side of the imaging lens system. Moreover, the object-side surface of the image-side second lens element can have at least one critical point in an off-axis region thereof. Therefore, it is favorable for adjusting the angle of incidence at the periphery of the image-side second lens element so as to reduce surface reflection. The image-side surface of the image-side first lens element can have at least one critical point in an off-axis region thereof. Therefore, it is favorable for adjusting the incident direction of light on the image surface so as to increase illuminance on the periphery of the image surface and improve response efficiency of the image sensor. Please refer to FIG. 10, which shows a schematic view of critical points C of the object-side surface 161 and the image-side surface 162 of the sixth lens element 160 and the image-side surface 172 of the seventh lens element 170 according to Mode 2 of the 1st embodiment of the present disclosure, wherein the sixth lens element 160 is the image-side second lens element, and the seventh lens element 170 is the image-side first lens element. The critical points on the object-side surface and the image-side surface of the sixth lens element and the image-side surface of the seventh lens element in FIG. 10 are only exemplary. The other lens surfaces of the seven lens elements may also have one or more critical points.

When a maximum focal length of the optical photographing lens assembly is fmax, and a minimum focal length of the optical photographing lens assembly is fmin, the following condition can be satisfied: 1.15<fmax/fmin. Therefore, it is favorable for the optical photographing lens assembly to achieve a proper optical zoom ratio. Moreover, the following condition can also be satisfied: 1.30<fmax/fmin. Moreover, the following condition can also be satisfied: 1.45<fmax/fmin. Moreover, the following condition can also be satisfied: fmax/fmin<5.0. Therefore, it is favorable for preventing image quality degradation caused by overly large zoom ratio. Moreover, the following condition can also be satisfied: fmax/fmin<3.0. The maximum focal length of the optical photographing lens assembly is the maximum value within a range where the focal length of the optical photographing lens assembly can be changed in accordance with various conditions. Similarly, the minimum focal length of the optical photographing lens assembly is the minimum value within a range where the focal length of the optical photographing lens assembly can be changed in accordance with various conditions.

According to the present disclosure, the optical photographing lens assembly can perform optical zoom in accordance with different focusing conditions to be in various modes with different focal lengths. In at least one mode of the optical photographing lens assembly, when an f-number of the optical photographing lens assembly is Fno, the following condition can be satisfied: 0.50<Fno<2.5. Therefore, it is favorable for the optical photographing lens assembly to have a proper aperture size during the zoom process so as to prevent image quality degradation, and it is also favorable for increasing illuminance on the image surface. Moreover, the following condition can also be satisfied: 0.80<Fno<2.0.

In at least one mode of the optical photographing lens assembly, when a focal length of the optical photographing lens assembly is f, and a focal length of the focus tunable component is ft, the following condition can be satisfied: 0.10<|f/ft|. Therefore, it is favorable for increasing the refractive power of the focus tunable component so as to increase zoom ratio. Moreover, the following condition can also be satisfied: 0.20<|f/ft|. Moreover, the following condition can also be satisfied: |f/ft|<0.50. Therefore, it is favorable for preventing aberrations generated due to overly strong refractive power of the focus tunable component. Moreover, the following condition can also be satisfied: |f/ft|<0.35.

In at least one mode of the optical photographing lens assembly, when the focal length of the focus tunable component is ft, the following condition can be satisfied: |ft|<50.0 [mm]. Therefore, it is favorable for increasing the degree of influence of the focus tunable component on the optical photographing lens assembly during the zoom process. Moreover, the following condition can also be satisfied: |ft|<40.0 [mm]. Moreover, the following condition can also be satisfied: |ft|<30.0 [mm].

When a maximum value among refractive indices of all lens elements in the imaging lens system is Nimax, the following condition can be satisfied: 1.66<Nimax<1.75. Therefore, using materials having high refractive index is favorable for further reducing the size of the imaging lens system and correcting aberrations.

When a minimum value among Abbe numbers of all lens elements in the imaging lens system is Vimin, the following condition can be satisfied: 10.0<Vimin<20.0. Therefore, using materials having small Abbe number is favorable for correcting aberrations such as chromatic aberration.

When a sum of central thicknesses of all lens elements in the imaging lens system is ΣCTi, and a sum of axial distances between each of all adjacent lens elements in the imaging lens system is ΣATi, the following condition can be satisfied: 0.50<ΣCTi/ΣATi<10. Therefore, it is favorable for adjusting the arrangement of lens elements so as to reduce the size of the imaging lens system. Moreover, the following condition can also be satisfied: 1.2<ΣCTi/ΣATi<5.0. Moreover, the following condition can also be satisfied: 1.5<ΣCTi/ΣATi<3.0.

Figure 12:
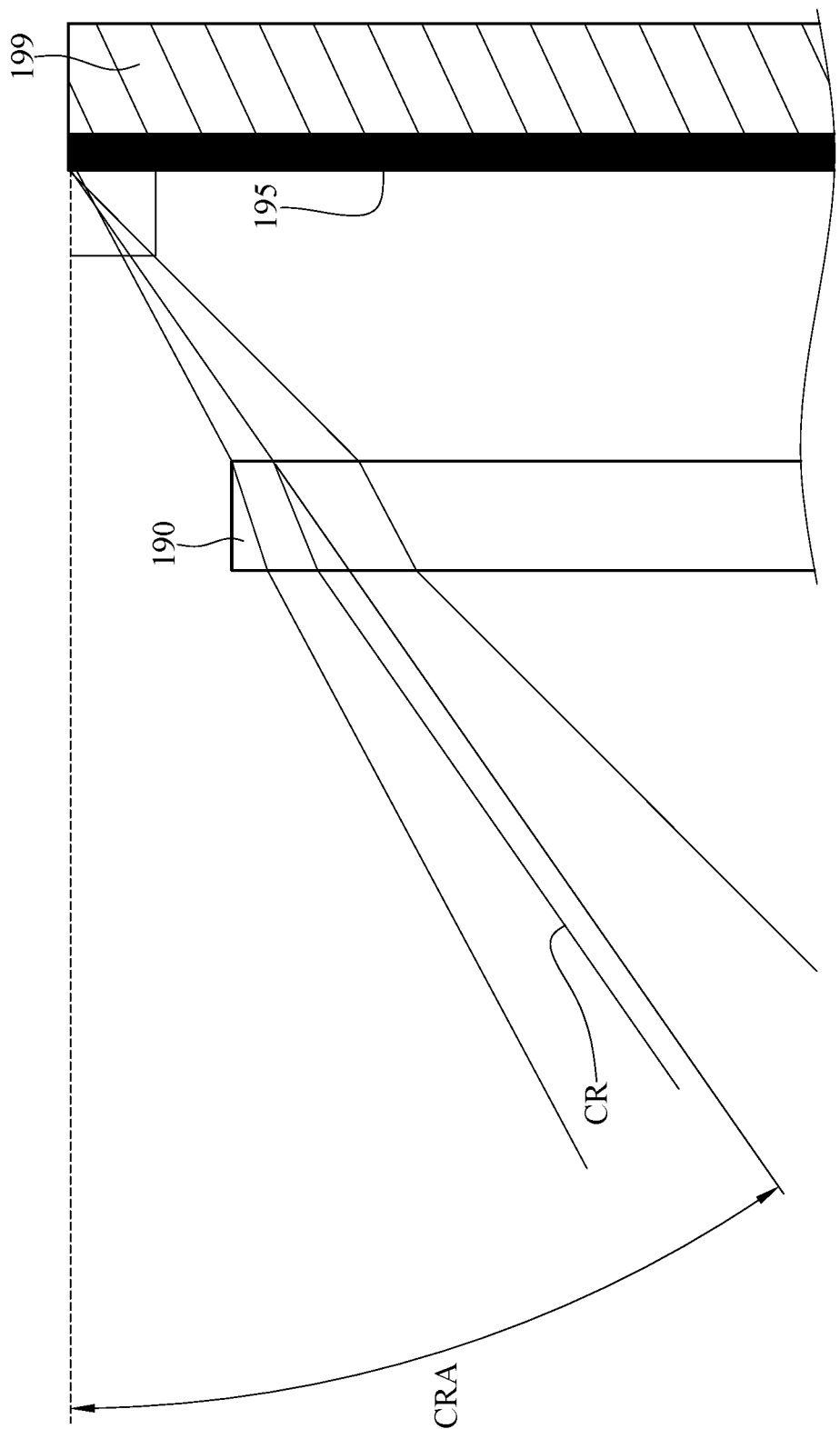
FIG. 12 shows a schematic view of CRA according to Mode 2 of the 1st embodiment of the present disclosure.

When a chief ray angle at a maximum image height position of the optical photographing lens assembly is CRA, the following condition can be satisfied: 25.0 [deg.]<CRA<50.0 [deg.]. Therefore, it is favorable for adjusting the incident angle of light on the image surface so as to improve response efficiency of the image sensor. Moreover, the following condition can also be satisfied: 30.0 [deg.]<CRA<45.0 [deg.]. Please refer to FIG. 12, which shows a schematic view of CRA according to Mode 2 of the 1st embodiment of the present disclosure, wherein a chief ray CR is projected on the image surface 195 at the maximum image height position, and the angle between a normal line of the image surface 195 and the chief ray CR is CRA.

When a maximum image height of the optical photographing lens assembly (half of a diagonal length of an effective photosensitive area of an image sensor) is ImgH, and an axial distance between the image-side surface of the image-side first lens element and the image surface is BL, the following condition can be satisfied: 2.5<ImgH/BL. Therefore, it is favorable for adjusting the back focal length and the image surface size so as to improve response efficiency of the image sensor. Moreover, the following condition can also be satisfied: 4.0<ImgH/BL<10.0. Please refer to FIG. 11, which shows a schematic view of BL according to Mode 2 of the 1st embodiment of the present disclosure.

When a central thickness of the focus tunable component is Dt, the following condition can be satisfied: 0.10 [mm]<Dt<2.00 [mm]. Therefore, it is favorable for the focus tunable component to have a proper zooming capability and also for preventing the focus tunable component from occupying too much space. Moreover, the following condition can also be satisfied: 0.20 [mm]<Dt<1.80 [mm]. Please refer to FIG. 11, which shows a schematic view of Dt according to Mode 2 of the 1st embodiment of the present disclosure.

When an axial distance between the object-side surface of the object-side first lens element and the image-side surface of the image-side first lens element is TDi, and the central thickness of the focus tunable component is Dt, the following condition can be satisfied: 1.50<TDi/Dt<50.0. Therefore, it is favorable for adjusting the arrangement of the focus tunable component and the imaging lens system so as to reduce the size of the optical photographing lens assembly. Moreover, the following condition can also be satisfied: 2.40<TDi/Dt<30.0. Moreover, the following condition can also be satisfied: 3.00<TDi/Dt<20.0. Please refer to FIG. 11, which shows a schematic view of TDi and Dt according to Mode 2 of the 1st embodiment of the present disclosure.

When the axial distance between the object-side surface of the object-side first lens element and the image-side surface of the image-side first lens element is TDi, and the focal length of the optical photographing lens assembly is f, the following condition can be satisfied: 0.50<TDi/f<2.0. Therefore, it is favorable for obtaining a balance between the size and field of view of the optical photographing lens assembly.

When an axial distance between the object-side surface of the object-side first lens element and the image surface is TLi, the following condition can be satisfied: 3.5 [mm]<TLi<10.0 [mm]. Therefore, it is favorable for the imaging lens system to have a proper size, and it is also favorable for ensuring the image quality. Moreover, the following condition can also be satisfied: 4.0 [mm]<TLi<8.5 [mm]. Please refer to FIG. 11, which shows a schematic view of TLi according to Mode 2 of the 1st embodiment of the present disclosure.

When the axial distance between the object-side surface of the object-side first lens element and the image surface is TLi, and an entrance pupil diameter of the optical photographing lens assembly is EPD, the following condition can be satisfied: 1.0<TLi/EPD<3.0. Therefore, it is favorable for obtaining a balance between the assembly size and the aperture size.

In at least one mode of the optical photographing lens assembly, when the axial distance between the object-side surface of the object-side first lens element and the image surface is TLi, and the focal length of the optical photographing lens assembly is f, the following condition can be satisfied: 0.50<TLi/f<2.0. Therefore, it is favorable for obtaining a balance between the size and field of view of the optical photographing lens assembly, and it is also favorable for increasing zoom ratio. Moreover, the following condition can also be satisfied: 1.1<TLi/f<1.5.

In at least one mode of the optical photographing lens assembly, when the focal length of the optical photographing lens assembly is f, the following condition can be satisfied: 5.0 [mm]<f. Therefore, it is favorable for adjusting the field of view and zoom ratio of the optical photographing lens assembly for various applications. Moreover, the following condition can also be satisfied: 6.0 [mm]<f. Moreover, the following condition can also be satisfied: f<15.0 [mm]. Therefore, it is favorable for adjusting the field of view and zoom ratio of the optical photographing lens assembly for various applications. Moreover, the following condition can also be satisfied: f<10.0 [mm].

When a curvature radius of the image-side surface of the image-side first lens element is RLr1r, and the axial distance between the object-side surface of the object-side first lens element and the image-side surface of the image-side first lens element is TDi, the following condition can be satisfied: 0.10<|RLr1r|/TDi<1.0. Therefore, it is favorable for adjusting the arrangement of lens elements and the shape of the image-side surface of the image-side first lens element so as to obtain a proper back focal length. Moreover, the following condition can also be satisfied: 0.20<|RLr1r|/TDi<0.80.

When a refractive index of each liquid material is NL, the following condition can be satisfied: 1.1<NL<2.0. Therefore, it is favorable for adjusting the refractive index of the liquid material for optical zoom. Moreover, the following condition can also be satisfied: 1.2<NL<1.6.

When an Abbe number of each liquid material is VL, the following condition can be satisfied: 10.0<VL<120.0. Therefore, it is favorable for adjusting the Abbe number of the liquid material in collaboration with the imaging lens system so as to reduce aberrations generated during the zoom process. Moreover, the following condition can also be satisfied: 25.0<VL<110.0. Moreover, the following condition can also be satisfied: 45.0<VL<100.0.

According to the present disclosure, one lens element having a lowest Abbe number and one lens element having a highest refractive index among all lens elements in the imaging lens system can be made of the same material. Therefore, a proper selection of material for the lens element is favorable for further correcting aberrations such as chromatic aberration and also reducing manufacturing costs. Moreover, the aforementioned same material can be plastic material. Therefore, it is favorable for increasing the shape variation of the lens surface(s) so as to further correct aberrations.

When the minimum value among Abbe numbers of all lens elements in the imaging lens system is Vimin, and the maximum value among refractive indices of all lens elements in the imaging lens system is Nimax, the following condition can be satisfied: 5.0<Vimin/Nimax<12.0. Therefore, it is favorable for the lens materials to collaborate with one another for correcting aberrations When half of a maximum field of view of the optical photographing lens assembly is HFOV, the following condition can be satisfied: 15.0 [deg.]<HFOV<90.0 [deg.]. Therefore, it is favorable for adjusting the field of view into a proper range for various applications. Moreover, the following condition can also be satisfied: 30.0 [deg.]< HFOV<55.0 [deg.]. Therefore, it is favorable for the optical photographing lens assembly to have a wide field of view, and it is also favorable for preventing distortion caused by an overly wide field of view. Moreover, the following condition can also be satisfied: 35.0 [deg.]<HFOV<45.0 [deg.].

When a maximum effective radius of the object-side surface of the object-side first lens element is YLf1f, and a maximum effective radius of the image-side surface of the image-side first lens element is YLr1r, the following condition can be satisfied: 1.50<YLr1r/YLf1f<5.00. Therefore, it is favorable for adjusting the outer diameter of the imaging lens system so as to obtain a proper size distribution, and it is also favorable for adjusting the travelling direction of light. Moreover, the following condition can also be satisfied: 1.80<YLr1r/YLf1f<3.50. Please refer to FIG. 10, which shows a schematic view of YLf1f and YLr1r according to Mode 2 of the 1st embodiment of the present disclosure.

According to the present disclosure, the optical photographing lens assembly further includes an aperture stop, and the aperture stop can be disposed between the object-side first lens element and an imaged object; that is, the aperture stop can be disposed on the object side of the object-side first lens element. Therefore, it is favorable for reducing the total track length and adjusting the field of view.

When an axial distance between the aperture stop and the image-side surface of the image-side first lens element is SDi, and the axial distance between the object-side surface of the object-side first lens element and the image-side surface of the image-side first lens element is TDi, the following condition can be satisfied: 0.60<SDi/TDi<1.1. Therefore, it is favorable for adjusting the position of the aperture stop so as to obtain a balance between the total track length and field of view of the optical photographing lens assembly. Moreover, the following condition can also be satisfied: 0.80<SDi/TDi<1.0. Please refer to FIG. 11, which shows a schematic view of SDi and TDi according to Mode 2 of the 1st embodiment of the present disclosure.

When an axial distance between a surface of the optical photographing lens assembly closest to the object side and the image surface is TL, the following condition can be satisfied: 5.0 [mm]<TL<15.0 [mm]. Therefore, it is favorable for adjusting the total track length of the optical photographing lens assembly for various applications, and it is also favorable for adjusting the field of view and zoom ratio. Moreover, the following condition can also be satisfied: 6.0 [mm]<TL<12.0 [mm]. Please refer to FIG. 11, which shows a schematic view of TL according to Mode 2 of the 1st embodiment of the present disclosure.

Figure 11:
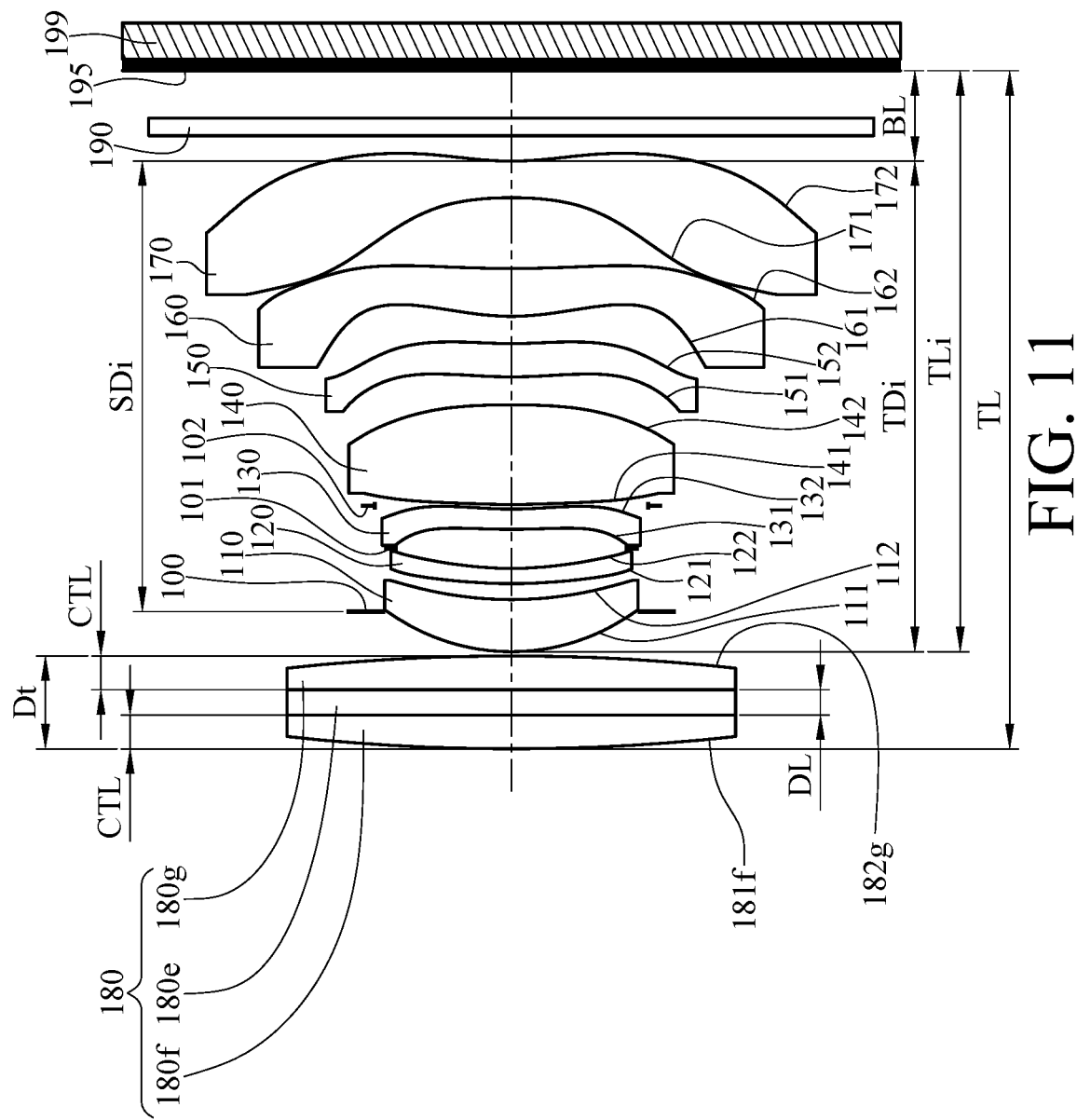
FIG. 11 shows a schematic view of CTL, Dt, DL, TL, SDi, TDi, TLi and BL according to Mode 2 of the 1st embodiment of the present disclosure.

According to the present disclosure, the at least two liquid materials can include the first liquid material and the second liquid material. When a central thickness of each liquid material is CTL, and an axial distance between the first liquid material and the second liquid material is DL, at least one of the first liquid material and the second liquid material in at least one mode of the optical photographing lens assembly can satisfy the following condition: 0.20<CTL/DL<5.0. Therefore, it is favorable for adjusting the stability of imaging during the optical zoom process. Moreover, the following condition can also be satisfied: 0.33<CTL/DL<3.0. Moreover, the following condition can also be satisfied: 0.50<CTL/DL<2.0. Please refer to FIG. 11, shows a schematic view of CTL and DL according to Mode 2 of the 1st embodiment of the present disclosure.

When the axial distance between the object-side surface of the object-side first lens element and the image-side surface of the image-side first lens element is TDi, and the axial distance between the image-side surface of the image-side first lens element and the image surface is BL, the following condition can be satisfied: 3.30<TDi/BL<25.0. Therefore, it is favorable for adjusting the distribution of lens elements and the back focal length so as to reduce the size of the optical photographing lens assembly. Moreover, the following condition can also be satisfied: 4.50<TDi/BL<15.0. Moreover, the following condition can also be satisfied: 5.00<TDi/BL<10.0.

When the axial distance between the object-side surface of the object-side first lens element and the image-side surface of the image-side first lens element is TDi, and the maximum image height of the optical photographing lens assembly is ImgH, the following condition can be satisfied: 0.50<TDi/ImgH<1.6. Therefore, it is favorable for adjusting the distribution of lens elements and the image surface size so as to obtain a balance among the assembly size, field of view and the image surface size.

When the axial distance between the object-side surface of the object-side first lens element and the image-side surface of the image-side first lens element is TDi, and a vertical distance between a non-axial critical point on the image-side surface of the image-side first lens element and an optical axis is YCLr1r, the image-side surface of the image-side first lens element can have at least one critical point in an off-axis region thereof satisfying the following condition: $1.0<TDi/YCLr1r<20$. Therefore, it is favorable for adjusting the position of the critical point and the arrangement of lens elements so as to further reduce the size of the imaging lens system. Moreover, the following condition can also be satisfied: $2.0<TDi/YCLr1r<10$. Please refer to FIG. 10, which shows a schematic view of YCLr1r according to Mode 2 of the 1st embodiment of the present disclosure.

When the central thickness of each liquid material is CTL, the following condition can be satisfied: $0.05$ [mm]$<$ CTL$<1.00$ [mm]. Therefore, it is favorable for adjusting the thickness of the liquid material so as to ensure zoom ratio and prevent the focus tunable component from occupying too much space. Moreover, the following condition can also be satisfied: $0.10$ [mm]$<$CTL$<0.80$ [mm].

Figure 15:
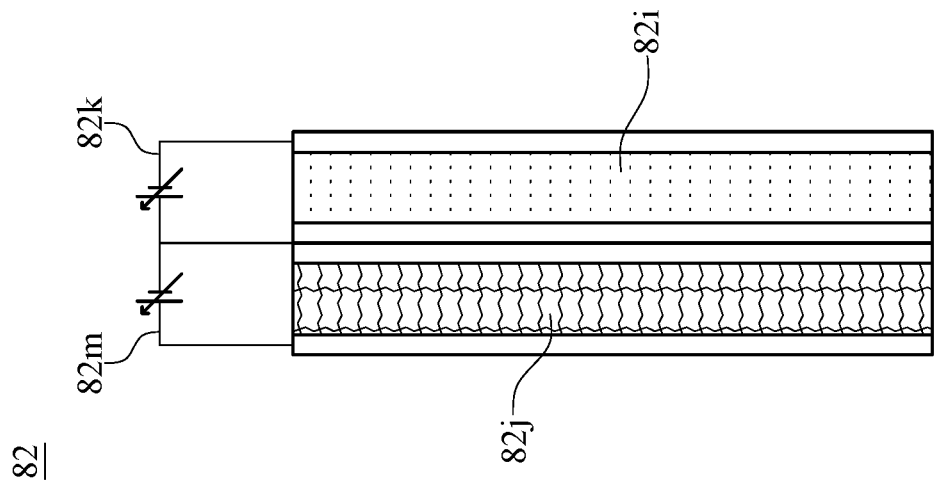
FIG. 15 is a schematic view of another focus tunable component of the present disclosure.
Figure 14:
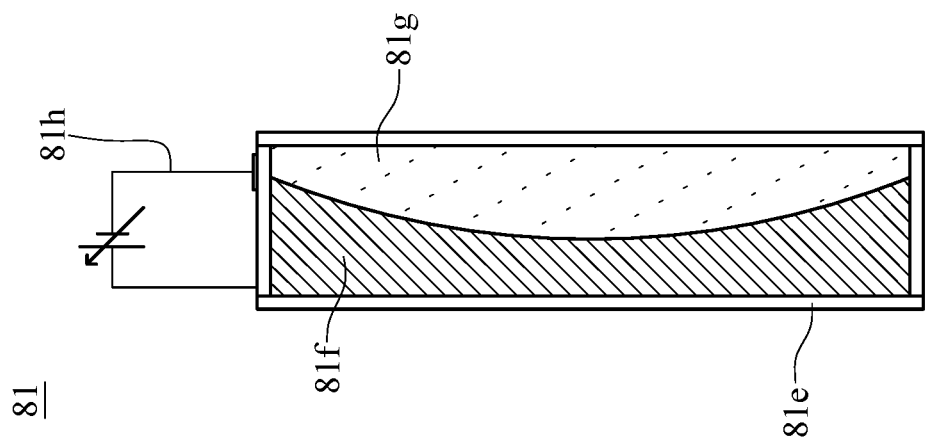
FIG. 14 is a schematic view of another focus tunable component of the present disclosure.
Figure 13:
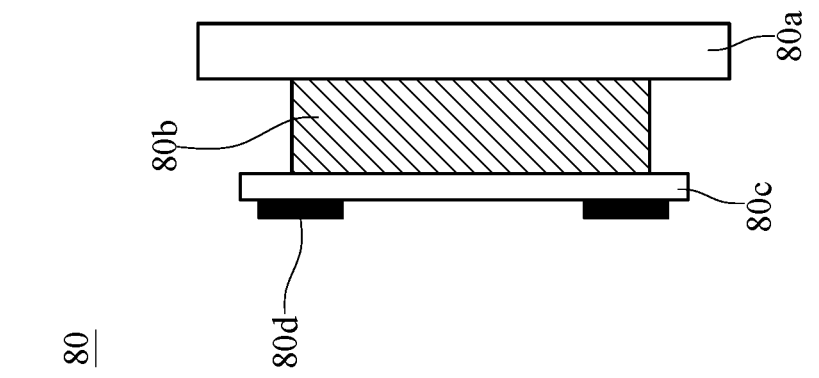
FIG. 13 is a schematic view of one focus tunable component of the present disclosure.

Please refer to FIG. 13, FIG. 14 and FIG. 15. FIG. 13 is a schematic view of one focus tunable component of the present disclosure, FIG. 14 is a schematic view of another focus tunable component of the present disclosure, and FIG. 15 is a schematic view of another focus tunable component of the present disclosure. In FIG. 13, a focus tunable component 80 includes a liquid lens set (its reference numeral is omitted), and the liquid lens set includes a transparent substrate 80a, a liquid material 80b, a flexible membrane 80c and a piezo film 80d. The transparent substrate 80a can be made of glass material or plastic material. The liquid material 80b is filled in between the transparent substrate 80a and the flexible membrane 80c. The flexible membrane 80c is connected to the piezo film 80d. When a voltage is applied across the piezo film 80d, the shape of the flexible membrane 80c changes and thus the focal length of the focus tunable component 80 is changed, thereby changing the focal length of the optical photographing lens assembly. In FIG. 14, a focus tunable component 81 includes a liquid lens set (its reference numeral is omitted), and the liquid lens set includes a transparent substrate 81e, a first liquid material 81f, a second liquid material 81g and a controlling circuit 81h. The transparent substrate 81e can be made of glass material or plastic material. The first liquid material 81f and the second liquid material 81g are filled in the transparent substrate 81e, and the first liquid material 81f and the second liquid material 81g are mutually insoluble. The shape of the contact surface between the first liquid material 81f and the second liquid material 81g changes when applying a voltage thereacross, and thus the focal length of the focus tunable component 81 is changed, thereby changing the focal length of the optical photographing lens assembly. In FIG. 15, a focus tunable component 82 includes a liquid crystal lens set (its reference numeral is omitted), and the liquid crystal lens set includes two liquid crystal lens elements 82i, 82j and two controlling circuits 82k, 82m. Each of the liquid crystal lens elements 82i, 82j includes a transparent substrate (its reference numeral is omitted) and a liquid crystal material (its reference numeral is omitted) filled in the transparent substrate. The transparent substrate can be made of glass material or plastic material. The liquid crystal lens elements 82i, 82j are respectively connected to the controlling circuits 82k, 82m. The focal lengths of the liquid crystal lens elements 82i, 82j are changed when applying a voltage thereacross, thereby changing the focal length of the focus tunable component 82. According to the present disclosure, the aforementioned features and conditions can be utilized in numerous combinations so as to achieve corresponding effects. For example, in the following specific embodiments, the focus tunable component of each of the embodiments can include a liquid lens set, a liquid crystal lens set, a positive lens element, a negative lens element or other optical components featuring focus tuning function. Also, the focus tunable component of each of the embodiments can be configured as the focus tunable component 80, the focus tunable component 81 or the focus tunable component 82 respectively in FIG. 13 to FIG. 15 according to actual design requirements for various applications.

According to the present disclosure, the lens elements in the imaging lens system can be made of either glass or plastic material. When the lens elements are made of glass material, the refractive power distribution of the imaging lens system may be more flexible, and the influence of environmental temperature change on the final image can be reduced, thereby reducing sensitivity. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the optical photographing lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the optical photographing lens assembly, based on the corresponding image sensor, can be flat or curved, especially a curved surface being concave facing towards the object side of the optical photographing lens assembly.

According to the present disclosure, an image correction unit, such as a field flattener, can be optionally disposed between the lens element closest to the image side of the optical photographing lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, the optical photographing lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the object-side first lens element can provide a longer distance between an exit pupil of the imaging lens system and the image surface to produce a telecentric effect, and thereby improves the image-sensing efficiency of an image sensor (for example, CCD or CMOS). A middle stop disposed between the object-side first lens element and the image surface is favorable for enlarging the viewing angle of the optical photographing lens assembly and thereby provides a wider field of view for the same.

According to the present disclosure, the optical photographing lens assembly can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

FIG. 1 is a schematic view of an image capturing unit in Mode 2 according to the 1st embodiment of the present disclosure. In FIG. 1, the image capturing unit includes the optical photographing lens assembly (its reference numeral is omitted) of the present disclosure and an image sensor 199. The optical photographing lens assembly includes a focus tunable component 180, an aperture stop 100, an imaging lens system (its reference numeral is omitted), a stop 101, a stop 102, a filter 190 and an image surface 195. The imaging lens system includes a first lens element 110, a second lens element 120, a third lens element 130, a fourth lens element 140, a fifth lens element 150, a sixth lens element 160 and a seventh lens element 170. Further, the aforementioned components of the optical photographing lens assembly are arranged in order from an object side to an image side as follows: the focus tunable component 180, the aperture stop 100, the first lens element 110, the second lens element 120, the stop 101, the third lens element 130, the stop 102, the fourth lens element 140, the fifth lens element 150, the sixth lens element 160, the seventh lens element 170, the filter 190 and the image surface 195. In addition, the imaging lens system has a configuration including a first lens group and a second lens group. Specifically, the imaging lens system includes, in order from the object side to the image side, the first lens group and the second lens group. The first lens group includes, in order from the object side to the image side, an object-side first lens element (the first lens element 110) and an object-side second lens element (the second lens element 120), and the second lens group includes, in order from the image side to the object side, an image-side first lens element (the seventh lens element 170) and an image-side second lens element (the sixth lens element 160). The imaging lens system includes seven lens elements (110, 120, 130, 140, 150, 160 and 170) with no additional lens element disposed between each of the adjacent seven lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric. The image-side surface 112 of the first lens element 110 has at least one inflection point.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The object-side surface 131 of the third lens element 130 has at least one inflection point. The image-side surface 132 of the third lens element 130 has at least one inflection point.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric. The image-side surface 142 of the fourth lens element 140 has at least one inflection point.

The fifth lens element 150 with positive refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The object-side surface 151 of the fifth lens element 150 has at least one inflection point. The image-side surface 152 of the fifth lens element 150 has at least one inflection point.

The sixth lens element 160 with positive refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The object-side surface 161 of the sixth lens element 160 has at least one inflection point. The image-side surface 162 of the sixth lens element 160 has at least one inflection point. The object-side surface 161 of the sixth lens element 160 has at least one critical point in an off-axis region thereof. The image-side surface 162 of the sixth lens element 160 has at least one critical point in an off-axis region thereof.

The seventh lens element 170 with negative refractive power has an object-side surface 171 being concave in a paraxial region thereof and an image-side surface 172 being concave in a paraxial region thereof. The seventh lens element 170 is made of plastic material and has the object-side surface 171 and the image-side surface 172 being both aspheric. The object-side surface 171 of the seventh lens element 170 has at least one inflection point. The image-side surface 172 of the seventh lens element 170 has at least one inflection point. The image-side surface 172 of the seventh lens element 170 has at least one critical point in an off-axis region thereof.

The focus tunable component 180 includes a liquid lens set (its reference numeral is omitted), and the liquid lens set includes a first liquid material 180f, a transparent substrate 180e, a second liquid material 180g, flexible membranes (not shown in FIG. 1) and a piezo film (not shown in FIG. 1). The first liquid material 180f and the second liquid material 180g are respectively disposed on an object-side surface and an image-side surface of the transparent substrate 180e. The first liquid material 180f and the second liquid material 180g are of the same material, and the transparent substrate 180e is made of glass material. The focus tunable component 180 is disposed between an imaged object and the imaging lens system for tuning its focal length in accordance with different conditions so as to adjust the focal length of the optical photographing lens assembly. Please refer to FIG. 16, which is a schematic view of the focus tunable component in Mode 1 and Mode 2 according to the 1st embodiment of the present disclosure, wherein the focus tunable component 180 on the left side of FIG. 16 is in Mode 1, and the focus tunable component 180 on the right side of FIG. 16 is in Mode 2. As shown in FIG. 16, the focal length of the focus tunable component 180 can be changed in accordance with different conditions by changing a curvature radius of an object-side surface 181f of the first liquid material 180f and a curvature radius of an image-side surface 182g of the second liquid material 180g so as to adjust the focal length of the optical photographing lens assembly.

The filter 190 is made of glass material and located between the seventh lens element 170 and the image surface 195, and will not affect the focal length of the optical photographing lens assembly. The image sensor 199 is disposed on or near the image surface 195 of the optical photographing lens assembly.

The equation of the aspheric surface profiles of the aforementioned lens elements of the 1st embodiment is expressed as follows:

$$X(Y) = (Y^2/R)/(1+sqrt(1-(1+k)\times(Y/R)^2)) + \sum_i (Ai)\times(Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the optical photographing lens assembly of the image capturing unit according to the 1st embodiment, a focal length of the optical photographing lens assembly is f, an f-number of the optical photographing lens assembly is Fno, half of a maximum field of view of the optical photographing lens assembly is HFOV, an axial distance between an imaged object and a surface of the optical photographing lens assembly closest to the object side is TOB, the curvature radius of the object-side surface 181f of the first liquid material 180f is RS1, and the curvature radius of an image-side surface 182g of the second liquid material 180g is RS4. With different focusing conditions, the aforementioned parameters have different values. In this embodiment, two of various modes of the optical photographing lens assembly are provided according to different focusing conditions. Mode 1 of the optical photographing lens assembly is the state where the optical photographing lens assembly forms an image of an imaged object considered to be an infinite distance away, and Mode 2 of the optical photographing lens assembly is the state where the optical photographing lens assembly forms an image of an imaged object at a finite distance therefrom. The following description begins with Mode 2 of the optical photographing lens assembly in the focusing condition of an imaged object located at a finite distance from the optical photographing lens assembly.

In Mode 2 of the optical photographing lens assembly, the abovementioned parameters have the following values: f=5.52 millimeters (mm), Fno=1.79, HFOV=38.9 degrees (deg.), TOB=1000.000 mm, RS1=24.266 mm, and RS4=−24.266 mm. In this embodiment, the surface of the optical photographing lens assembly closest to the object side is the object-side surface 181f of the first liquid material 180f, so TOB is an axial distance between an imaged object and the object-side surface 181f of the first liquid material 180f.

When a focal length of the focus tunable component 180 is ft, the following condition is satisfied: ft=23.29 [mm].

When a central thickness of one of the first liquid material 180f and the second liquid material 180g is CTL, the first liquid material 180f and the second liquid material 180g respectively satisfy the following conditions: CTL=0.400 [mm] and CTL=0.400 [mm].

When the central thickness of one of the first liquid material 180f and the second liquid material 180g is CTL, and an axial distance between the first liquid material 180f and the second liquid material 180g is DL, the first liquid material 180f and the second liquid material 180g respectively satisfy the following conditions: CTL/DL=1.33 and CTL/DL=1.33.

When a central thickness of the focus tunable component 180 is Dt, the following condition is satisfied: Dt=1.100 [mm].

When an axial distance between an object-side surface of the object-side first lens element and an image-side surface of the image-side first lens element is TDi, and an axial distance between the image-side surface of the image-side first lens element and the image surface 195 is BL, the following condition is satisfied: TDi/BL=5.43. In this embodiment, the object-side surface of the object-side first lens element is the object-side surface 111 of the first lens element 110, and the image-side surface of the image-side first lens element is the image-side surface 172 of the seventh lens element 170, so TDi is an axial distance between the object-side surface 111 of the first lens element 110 and the image-side surface 172 of the seventh lens element 170, and BL is an axial distance between the image-side surface 172 of the seventh lens element 170 and the image surface 195.

When the axial distance between the object-side surface of the object-side first lens element and the image-side surface of the image-side first lens element is TDi, and the central thickness of the focus tunable component 180 is Dt, the following condition is satisfied: TDi/Dt=5.28.

When the axial distance between the object-side surface of the object-side first lens element and the image-side surface of the image-side first lens element is TDi, and the focal length of the optical photographing lens assembly is f, the following condition is satisfied: TDi/f=1.05.

When the axial distance between the object-side surface of the object-side first lens element and the image-side surface of the image-side first lens element is TDi, and a maximum image height of the optical photographing lens assembly is ImgH, the following condition is satisfied: TDi/ImgH=1.26.

When an axial distance between the surface of the optical photographing lens assembly closest to the object side and the image surface 195 is TL, the following condition is satisfied: TL=8.023 [mm]. In this embodiment, the surface of the optical photographing lens assembly closest to the object side is the object-side surface 181f of the first liquid material 180f, so TL is an axial distance between the object-side surface 181f of the first liquid material 180f and the image surface 195.

When an axial distance between the object-side surface of the object-side first lens element and the image surface 195 is TLi, and an entrance pupil diameter of the optical photographing lens assembly is EPD, the following condition is satisfied: TLi/EPD=2.21. In this embodiment, the object-side surface of the object-side first lens element is the object-side surface 111 of the first lens element 110, so TLi is an axial distance between the object-side surface 111 of the first lens element 110 and the image surface 195.

When the axial distance between the object-side surface of the object-side first lens element and the image surface 195 is TLi, and the focal length of the optical photographing lens assembly is f, the following condition is satisfied: TLi/f=1.25.

When the focal length of the optical photographing lens assembly is f, and the focal length of the focus tunable component 180 is ft, the following condition is satisfied: |f/ft|=0.24.

When a chief ray angle at a maximum image height position of the optical photographing lens assembly is CRA, the following condition is satisfied: CRA=34.8 [deg.].

When the maximum image height of the optical photographing lens assembly is ImgH, and the axial distance between the image-side surface of the image-side first lens element and the image surface 195 is BL, the following condition is satisfied: ImgH/BL=4.30.

When a maximum effective radius of the object-side surface of the object-side first lens element is YLf1f, and a maximum effective radius of the image-side surface of the image-side first lens element is YLr1r, the following condition is satisfied: YLr1r/YLf1f=2.41. In this embodiment, the object-side surface of the object-side first lens element is the object-side surface 111 of the first lens element 110, and the image-side surface of the image-side first lens element is the image-side surface 172 of the seventh lens element 170, so YLf1f is a maximum effective radius of the object-side surface 111 of the first lens element 110, and YLr1r is a maximum effective radius of the image-side surface 172 of the seventh lens element 170.

When a maximum value among refractive indices of all lens elements in the imaging lens system is Nimax, the following condition is satisfied: Nimax=1.701. In this embodiment, among the first through seventh lens elements (110-170), a refractive index of the second lens element 120 and a refractive index of the third lens element 130 are the same and both are larger than the refractive indices of the other lens elements, and Nimax is equal to the refractive index of the second lens element 120 and the refractive index of the third lens element 130.

When a refractive index of one of the first liquid material 180f and the second liquid material 180g is NL, the first liquid material 180f and the second liquid material 180g respectively satisfy the following conditions: NL=1.525 and NL=1.525.

When a minimum value among Abbe numbers of all lens elements in the imaging lens system is Vimin, the following condition is satisfied: Vimin=16.4. In this embodiment, among the first through seventh lens elements (110-170), an Abbe number of the second lens element 120 and an Abbe number of the third lens element 130 are the same and both are smaller than the Abbe numbers of the other lens elements, and Vimin is equal to the Abbe number of the second lens element 120 and the Abbe number of the third lens element 130.

When the minimum value among Abbe numbers of all lens elements in the imaging lens system is Vimin, and the maximum value among refractive indices of all lens elements in the imaging lens system is Nimax, the following condition is satisfied: Vimin/Nimax=9.64.

When an Abbe number of one of the first liquid material 180f and the second liquid material 180g is VL, the first liquid material 180f and the second liquid material 180g respectively satisfy the following conditions: VL=54.4 and VL=54.4.

When a sum of central thicknesses of all lens elements in the imaging lens system is ΣCTi, and a sum of axial distances between each of all adjacent lens elements in the imaging lens system is ΣATi, the following condition is satisfied: ΣCTi/ΣATi=1.64. In this embodiment, an axial distance between two adjacent lens elements is an air gap in a paraxial region between the two adjacent lens elements; ΣATi is a sum of axial distances between the first lens element 110 and the second lens element 120, the second lens element 120 and the third lens element 130, the third lens element 130 and the fourth lens element 140, the fourth lens element 140 and the fifth lens element 150, the fifth lens element 150 and the sixth lens element 160, and the sixth lens element 160 and the seventh lens element 170; ΣCTi is a sum of central thicknesses of the first lens element 110, the second lens element 120, the third lens element 130, the fourth lens element 140, the fifth lens element 150, the sixth lens element 160 and the seventh lens element 170.

When the axial distance between the object-side surface of the object-side first lens element and the image surface 195 is TLi, the following condition is satisfied: TLi=6.873 [mm].

When an axial distance between the aperture stop 100 and the image-side surface of the image-side first lens element is SDi, and the axial distance between the object-side surface of the object-side first lens element and the image-side surface of the image-side first lens element is TDi, the following condition is satisfied: SDi/TDi=0.92. In this embodiment, the image-side surface of the image-side first lens element is the image-side surface 172 of the seventh lens element 170, so SDi is an axial distance between the aperture stop 100 and the image-side surface 172 of the seventh lens element 170.

When a curvature radius of the image-side surface of the image-side first lens element is $RL_{r1r}$, and the axial distance between the object-side surface of the object-side first lens element and the image-side surface of the image-side first lens element is TDi, the following condition is satisfied: $|RL_{r1r}|/TDi=0.62$. In this embodiment, the image-side surface of the image-side first lens element is the image-side surface 172 of the seventh lens element 170, so $RL_{r1r}$ is a curvature radius of the image-side surface 172 of the seventh lens element 170.

When a maximum focal length of the optical photographing lens assembly is fmax, and a minimum focal length of the optical photographing lens assembly is fmin, the following condition is satisfied: fmax/fmin=1.55.

When the number of lens elements in the imaging lens system is LNi, the following condition is satisfied: LNi=7.

When the axial distance between the object-side surface of the object-side first lens element and the image-side surface of the image-side first lens element is TDi, and a vertical distance between a non-axial critical point on the image-side surface of the image-side first lens element and the optical axis is $YCL_{r1r}$, the following condition is satisfied: $TDi/YCL_{r1r}=4.41$. In this embodiment, the image-side surface of the image-side first lens element is the image-side surface 172 of the seventh lens element 170, so $YCL_{r1r}$ is a vertical distance between the non-axial critical point on the image-side surface 172 of the seventh lens element 170 and the optical axis.

The detailed optical data of the 1st embodiment are shown in Table 1 and the aspheric surface data are shown in Table 2 below.

TABLE 1

1st Embodiment

| Surface # | | Curvature Radius | Thickness | Material | Index | Abbe # | Focal Length |
|---|---|---|---|---|---|---|---|
| 0 | Object | Plano | TOB | | | | |
| 1 | Focus Tunable Component | RS1 | 0.400 | Liquid Material | 1.525 | 54.4 | |
| 2 | | Plano | 0.300 | Glass | 1.517 | 64.2 | |
| 3 | | Plano | 0.400 | Liquid Material | 1.525 | 54.4 | |
| 4 | | RS4 | 0.524 | | | | |
| 5 | Ape. Stop | Plano | −0.474 | | | | |
| 6 | Lens 1 | 2.491 (ASP) | 0.616 | Plastic | 1.526 | 58.1 | 9.95 |
| 7 | | 4.348 (ASP) | 0.189 | | | | |
| 8 | Lens 2 | 5.964 (ASP) | 0.180 | Plastic | 1.701 | 16.4 | −21.02 |
| 9 | | 4.192 (ASP) | 0.237 | | | | |
| 10 | Stop | Plano | 0.225 | | | | |
| 11 | Lens 3 | 7.234 (ASP) | 0.240 | Plastic | 1.701 | 16.4 | −18.40 |
| 12 | | 4.572 (ASP) | 0.039 | | | | |
| 13 | Stop | Plano | 0.015 | | | | |
| 14 | Lens 4 | 8.613 (ASP) | 1.179 | Plastic | 1.526 | 58.1 | 9.48 |
| 15 | | −11.275 (ASP) | 0.331 | | | | |
| 16 | Lens 5 | 5.057 (ASP) | 0.393 | Plastic | 1.566 | 37.4 | 321.99 |
| 17 | | 5.055 (ASP) | 0.323 | | | | |
| 18 | Lens 6 | 2.807 (ASP) | 0.567 | Plastic | 1.526 | 58.1 | 6.17 |
| 19 | | 19.288 (ASP) | 0.837 | | | | |
| 20 | Lens 7 | −4.453 (ASP) | 0.433 | Plastic | 1.526 | 58.1 | −3.71 |
| 21 | | 3.598 (ASP) | 0.300 | | | | |
| 22 | Filter | Plano | 0.210 | Glass | 1.517 | 64.2 | — |
| 23 | | Plano | 0.559 | | | | |
| 24 | Image | Plano | — | | | | |

Note:
Reference wavelength is 587.6 nm (d-line).
An effective radius of the stop 101 (Surface 10) is 1.365 mm.
An effective radius of the stop 102 (Surface 13) is 1.615 mm.

TABLE 2

Aspheric Coefficients

| | Surface # | | | | |
|---|---|---|---|---|---|
| | 6 | 7 | 8 | 9 | 11 |
| k= | −3.4878E−02 | 5.0061E−01 | −3.6613E−01 | −3.3112E+00 | −9.0000E+01 |
| A4= | 1.6254E−03 | −8.7385E−03 | −3.0944E−02 | −2.7337E−02 | −6.0355E−02 |
| A6= | −6.1011E−03 | 1.0137E−02 | 3.5818E−02 | 3.5573E−02 | 1.6787E−02 |
| A8= | 1.4220E−02 | −7.0319E−03 | −2.7634E−02 | −3.2121E−02 | −3.2152E−02 |
| A10= | −1.5674E−02 | 1.4655E−03 | 1.3958E−02 | 1.8184E−02 | 1.4122E−02 |
| A12= | 9.0225E−03 | 6.2350E−04 | −3.5179E−03 | −5.9094E−03 | −2.9146E−03 |
| A14= | −2.6235E−03 | −2.9803E−04 | 4.6337E−04 | 9.5915E−04 | 3.3867E−04 |
| A16= | 2.9316E−04 | — | — | — | — |

TABLE 2-continued

Aspheric Coefficients

| | Surface # | | | | |
|---|---|---|---|---|---|
| | 12 | 14 | 15 | 16 | 17 |
| k= | −2.5680E+01 | 4.3032E+00 | 2.6628E+01 | −8.9652E+01 | 3.2360E+00 |
| A4= | −9.4612E−02 | −6.9754E−02 | −5.3084E−02 | −4.3817E−02 | −1.6867E−01 |
| A6= | 7.8009E−02 | 8.1093E−02 | 4.2952E−02 | 3.1842E−02 | 1.3749E−01 |
| A8= | −7.6509E−02 | −6.0813E−02 | −4.4035E−02 | −3.0295E−02 | −9.8311E−02 |
| A10= | 4.0051E−02 | 3.1893E−02 | 3.1716E−02 | 1.4577E−02 | 4.7400E−02 |
| A12= | −1.0819E−02 | −1.0464E−02 | −1.3995E−02 | −4.4026E−03 | −1.5857E−02 |
| A14= | 1.3469E−03 | 1.8637E−03 | 3.7241E−03 | 9.0719E−04 | 3.6605E−03 |
| A16= | −2.6706E−05 | −1.3527E−04 | −5.5938E−04 | −1.1711E−04 | −5.4594E−04 |
| A18= | — | — | 3.6697E−05 | 6.6727E−06 | 4.6725E−05 |
| A20= | — | — | — | — | −1.7393E−06 |

| | Surface # | | | |
|---|---|---|---|---|
| | 18 | 19 | 20 | 21 |
| k= | −4.3851E−01 | 1.7617E+01 | −2.0986E+00 | −9.1685E−01 |
| A4= | −8.4721E−02 | 2.0186E−02 | −6.3318E−02 | −7.5545E−02 |
| A6= | 2.4327E−02 | −3.2653E−02 | 3.3966E−03 | 2.0348E−02 |
| A8= | −5.7917E−03 | 1.8362E−02 | 6.2613E−03 | −3.8615E−03 |
| A10= | −8.2218E−04 | −6.2705E−03 | −2.0599E−03 | 5.1124E−04 |
| A12= | 8.0005E−04 | 1.3271E−03 | 3.3331E−04 | −4.9497E−05 |
| A14= | −2.1216E−04 | −1.7448E−04 | −3.2692E−05 | 3.4955E−06 |
| A16= | 2.6144E−05 | 1.3986E−05 | 1.9555E−06 | −1.6963E−07 |
| A18= | −1.2079E−06 | −6.3367E−07 | −6.4625E−08 | 4.9489E−09 |
| A20= | — | 1.2583E−08 | 8.8503E−10 | −6.3116E−11 |

In Table 1, the curvature radius, the thickness and the focal length are shown in millimeters (mm). Surface numbers 0-24 represent the surfaces sequentially arranged from the object side to the image side along the optical axis. In Table 2, k represents the conic coefficient of the equation of the aspheric surface profiles. A4-20 represent the aspheric coefficients ranging from the 4th order to the 20th order.

The rest optical data of the optical photographing lens assembly, including in Mode 1, are disclosed in Table 3 below. Also, the definitions of the parameters shown in Table 3 are consistent with those stated in Mode 2. Moreover, the tables presented below for each embodiment are the corresponding schematic parameter and aberration curves, and the definitions of the tables are the same as Table 1 to Table 3 of the 1st embodiment. Therefore, an explanation in this regard will not be provided again.

TABLE 3

1st Embodiment

| | Mode 1 | Mode 2 | | |
|---|---|---|---|---|
| f [mm] | 8.52 | 5.52 | Nimax | 1.701 |
| Fno | 2.86 | 1.79 | NL | 1.525, 1.525 |
| HFOV [deg.] | 41.7 | 38.9 | Vimin | 16.4 |
| TOB [mm] | ∞ | 1000.000 | Vimin/Nimax | 9.64 |
| RS1 [mm] | ∞ | 24.266 | VL | 54.4, 54.4 |
| RS4 [mm] | ∞ | −24.266 | ΣCTi/ΣATi | 1.64 |
| ft [mm] | ∞ | 23.29 | TLi [mm] | 6.873 |
| CTL [mm] | 0.400, 0.400 | 0.400, 0.400 | SDi/TDi | 0.92 |
| CTL/DL | 1.33, 1.33 | 1.33, 1.33 | |RLr1r|/TDi | 0.62 |
| Dt [mm] | 1.100 | 1.100 | fmax/fmin | 1.55 |
| TDi/BL | 5.43 | 5.43 | LNi | 7 |
| TDi/Dt | 5.28 | 5.28 | TDi/YCLr1r | 4.41 |
| TDi/f | 0.68 | 1.05 | — | — |
| TDi/ImgH | 1.26 | 1.26 | — | — |
| TL [mm] | 8.023 | 8.023 | — | — |
| TLi/EPD | 2.31 | 2.21 | — | — |
| TLi/f | 0.81 | 1.25 | — | — |
| |f/ft| | 0.00 | 0.24 | — | — |

TABLE 3-continued

1st Embodiment

| | Mode 1 | Mode 2 | | |
|---|---|---|---|---|
| CRA [deg.] | 34.8 | 34.8 | — | — |
| ImgH/BL | 4.30 | 4.30 | — | — |
| YLr1r/YLf1f | 2.51 | 2.41 | — | — |

2nd Embodiment

Figure 2:
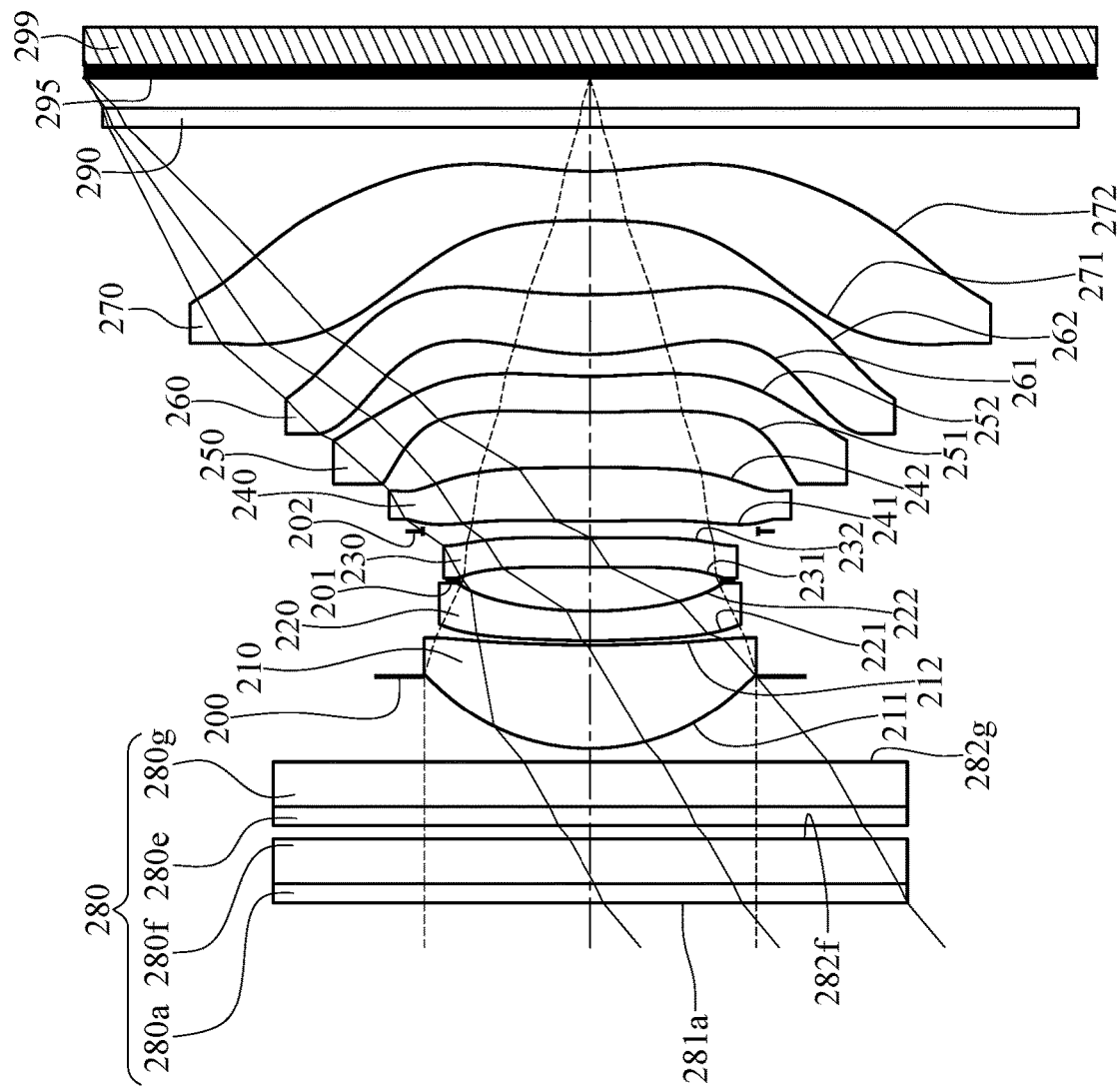
FIG. 2 is a schematic view of an image capturing unit in Mode 1 according to the 2nd embodiment of the present disclosure.

FIG. 2 is a schematic view of an image capturing unit in Mode 1 according to the 2nd embodiment of the present disclosure. In FIG. 2, the image capturing unit includes the optical photographing lens assembly (its reference numeral is omitted) of the present disclosure and an image sensor 299. The optical photographing lens assembly includes a focus tunable component 280, an aperture stop 200, an imaging lens system (its reference numeral is omitted), a stop 201, a stop 202, a filter 290 and an image surface 295. The imaging lens system includes a first lens element 210, a second lens element 220, a third lens element 230, a fourth lens element 240, a fifth lens element 250, a sixth lens element 260 and a seventh lens element 270. Further, the aforementioned components of the optical photographing lens assembly are arranged in order from an object side to an image side as follows: the focus tunable component 280, the aperture stop 200, the first lens element 210, the second lens element 220, the stop 201, the third lens element 230, the stop 202, the fourth lens element 240, the fifth lens element 250, the sixth lens element 260, the seventh lens element 270, the filter 290 and the image surface 295. In addition, the imaging lens system has a configuration including a first lens group and a second lens group. Specifically, the imaging lens system includes, in order from the object side to the image side, the first lens group and the second lens group. The first lens group includes, in order from the object side to the image side, an object-side first lens element (the first lens element 210) and an object-side second lens element (the second lens element 220), and the second lens group includes, in order from the image side to the object side, an image-side first lens element (the seventh lens element 270) and an image-side second lens element (the sixth lens element 260). The imaging lens system includes seven lens elements (210, 220, 230, 240, 250, 260 and 270) with no additional lens element disposed between each of the adjacent seven lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric. The object-side surface 211 of the first lens element 210 has at least one inflection point. The image-side surface 212 of the first lens element 210 has at least one inflection point.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has at least one inflection point. The image-side surface 232 of the third lens element 230 has at least one inflection point.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric. The object-side surface 241 of the fourth lens element 240 has at least one inflection point. The image-side surface 242 of the fourth lens element 240 has at least one inflection point.

The fifth lens element 250 with negative refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. The object-side surface 251 of the fifth lens element 250 has at least one inflection point. The image-side surface 252 of the fifth lens element 250 has at least one inflection point.

The sixth lens element 260 with positive refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The object-side surface 261 of the sixth lens element 260 has at least one inflection point. The image-side surface 262 of the sixth lens element 260 has at least one inflection point. The object-side surface 261 of the sixth lens element 260 has at least one critical point in an off-axis region thereof. The image-side surface 262 of the sixth lens element 260 has at least one critical point in an off-axis region thereof.

The seventh lens element 270 with negative refractive power has an object-side surface 271 being concave in a paraxial region thereof and an image-side surface 272 being concave in a paraxial region thereof. The seventh lens element 270 is made of plastic material and has the object-side surface 271 and the image-side surface 272 being both aspheric. The object-side surface 271 of the seventh lens element 270 has at least one inflection point. The image-side surface 272 of the seventh lens element 270 has at least one inflection point. The image-side surface 272 of the seventh lens element 270 has at least one critical point in an off-axis region thereof.

The focus tunable component 280 includes a first liquid lens set (its reference numeral is omitted) and a second liquid lens set (its reference numeral is omitted). The first liquid lens set includes a transparent substrate 280$a$, a first liquid material 280$f$, a flexible membrane (not shown in FIG. 2) and a piezo film (not shown in FIG. 2), and the second liquid lens set includes a transparent substrate 280$e$, a second liquid material 280$g$, a flexible membrane (not shown in FIG. 2) and a piezo film (not shown in FIG. 2). The first liquid material 280$f$ is disposed on an image-side surface of the transparent substrate 280$a$, and the second liquid material 280$g$ is disposed on an image-side surface of the transparent substrate 280$e$. The first liquid material 280$f$ and the second liquid material 280$g$ are of the same material, and the transparent substrate 280$a$ and the transparent substrate 280$e$ are made of glass material. The focus tunable component 280 is disposed between an imaged object and the imaging lens system for tuning its focal length in accordance with different conditions by changing a central thickness of the first liquid material 280$f$, a curvature radius of an image-surface 282$f$ of the first liquid material 280$f$, a central thickness of the second liquid material 280$g$ and a curvature radius of an image-surface 282$g$ of the second liquid material 280$g$ so as to adjust the focal length of the optical photographing lens assembly.

The filter 290 is made of glass material and located between the seventh lens element 270 and the image surface 295, and will not affect the focal length of the optical photographing lens assembly. The image sensor 299 is disposed on or near the image surface 295 of the optical photographing lens assembly.

In this embodiment, two of various modes of the optical photographing lens assembly are provided according to different focusing conditions. The detailed optical data of the 2nd embodiment are shown in Table 4 and the aspheric surface data are shown in Table 5 below. In this embodiment, the central thickness of the first liquid material 280$f$ is TS2, an axial distance between the first liquid material 280$f$ and the transparent substrate 280$e$ is TS3, the central thickness of the second liquid material 280$g$ is TS5, an axial distance between the second liquid material 280$g$ and the aperture stop 200 is TS6, the curvature radius of the image-surface 282$f$ of the first liquid material 280$f$ is RS3, and the curvature radius of the image-surface 282$g$ of the second liquid material 280$g$ is RS6.

TABLE 4

| 2nd Embodiment | | | | | | |
|---|---|---|---|---|---|---|
| Surface # | | Curvature Radius | Thickness | Material | Index | Abbe # | Focal Length |
| 0 | Object | Plano | TOB | | | | |
| 1 | Focus Tunable Component | Plano | 0.210 | Glass | 1.513 | 56.9 | |

TABLE 4-continued

2nd Embodiment

| Surface # | | Curvature Radius | Thickness | Material | Index | Abbe # | Focal Length |
|---|---|---|---|---|---|---|---|
| 2 | | Plano | TS2 | Liquid Material | 1.300 | 92.7 | |
| 3 | | RS3 | TS3 | | | | |
| 4 | | Plano | 0.210 | Glass | 1.513 | 56.9 | |
| 5 | | Plano | TS5 | Liquid Material | 1.300 | 92.7 | |
| 6 | | RS6 | TS6 | | | | |
| 7 | Ape. Stop | Plano | −0.809 | | | | |
| 8 | Lens 1 | 2.437 (ASP) | 1.158 | Plastic | 1.545 | 56.1 | 5.55 |
| 9 | | 10.396 (ASP) | 0.050 | | | | |
| 10 | Lens 2 | 9.234 (ASP) | 0.329 | Plastic | 1.669 | 19.4 | −14.24 |
| 11 | | 4.622 (ASP) | 0.351 | | | | |
| 12 | Stop | Plano | 0.136 | | | | |
| 13 | Lens 3 | 33.101 (ASP) | 0.331 | Plastic | 1.669 | 19.4 | −77.35 |
| 14 | | 20.108 (ASP) | 0.073 | | | | |
| 15 | Stop | Plano | 0.113 | | | | |
| 16 | Lens 4 | 16.662 (ASP) | 0.598 | Plastic | 1.544 | 56.0 | 27.22 |
| 17 | | −131.696 (ASP) | 0.621 | | | | |
| 18 | Lens 5 | 11.276 (ASP) | 0.400 | Plastic | 1.566 | 37.4 | −18.79 |
| 19 | | 5.403 (ASP) | 0.244 | | | | |
| 20 | Lens 6 | 2.884 (ASP) | 0.666 | Plastic | 1.544 | 56.0 | 7.91 |
| 21 | | 8.033 (ASP) | 0.828 | | | | |
| 22 | Lens 7 | −12.731 (ASP) | 0.546 | Plastic | 1.534 | 55.9 | −5.71 |
| 23 | | 4.065 (ASP) | 0.500 | | | | |
| 24 | Filter | Plano | 0.210 | Glass | 1.517 | 64.2 | — |
| 25 | | Plano | 0.338 | | | | |
| 26 | Image | Plano | — | | | | |

Note:
Reference wavelength is 587.6 nm (d-line).
An effective radius of the stop 201 (Surface 12) is 1.470 mm.
An effective radius of the stop 202 (Surface 15) is 1.870 mm.
An effective radius of the image-side surface 272 (Surface 23) is 4.650 mm.

TABLE 5

Aspheric Coefficients

| Surface # | | | | |
|---|---|---|---|---|
| 8 | 9 | 10 | 11 | 13 |
| k= −4.8426E−01 | −9.3978E+01 | 1.7677E+01 | 5.8838E+00 | 7.8962E+01 |
| A4= 2.2607E−03 | −3.7421E−02 | −5.6852E−02 | −2.2717E−02 | −3.7777E−02 |
| A6= 5.1323E−03 | 4.7647E−02 | 7.2059E−02 | 4.2476E−02 | 3.1492E−02 |
| A8= −5.0154E−03 | −3.0442E−02 | −5.5186E−02 | −5.3989E−02 | −5.6222E−02 |
| A10= 3.2199E−03 | 1.2484E−02 | 3.0142E−02 | 4.8182E−02 | 5.6671E−02 |
| A12= −1.1805E−03 | −3.3837E−03 | −1.1015E−02 | −2.6409E−02 | −3.3555E−02 |
| A14= 2.3838E−04 | 5.5405E−04 | 2.3723E−03 | 7.7795E−03 | 1.0494E−02 |
| A16= −2.1497E−05 | −4.2874E−05 | −2.2012E−04 | −9.1687E−04 | −1.3124E−03 |

| Surface # | | | | |
|---|---|---|---|---|
| 14 | 16 | 17 | 18 | 19 |
| k= 3.3788E+01 | −7.6140E+00 | 9.9000E+01 | −9.9000E+01 | −9.9000E+01 |
| A4= −5.4055E−02 | −3.3435E−02 | −2.1631E−02 | −3.7307E−02 | −3.5728E−02 |
| A6= 6.5850E−02 | 2.1094E−02 | −1.3761E−03 | 3.3502E−02 | 1.4491E−03 |
| A8= −1.1390E−01 | −3.2541E−02 | 5.9566E−03 | −3.3185E−02 | 5.5205E−03 |
| A10= 1.2416E−01 | 3.6411E−02 | −7.6064E−03 | 2.1765E−02 | −3.5417E−03 |
| A12= −8.4146E−02 | −2.5085E−02 | 5.2382E−03 | −9.8189E−03 | 1.0164E−03 |
| A14= 3.4940E−02 | 1.0577E−02 | −2.0923E−03 | 2.8689E−03 | −1.5775E−04 |
| A16= −8.4121E−03 | −2.6097E−03 | 4.7901E−04 | −5.1253E−04 | 1.3816E−05 |
| A18= 1.0529E−03 | 3.4469E−04 | −5.7108E−05 | 5.0173E−05 | −6.5342E−07 |
| A20= −5.0811E−05 | −1.8831E−05 | 2.7205E−06 | −2.0328E−06 | 1.3349E−08 |

| Surface # | | | |
|---|---|---|---|
| 20 | 21 | 22 | 23 |
| k= −1.2488E+00 | −9.1959E+01 | 5.3589E+00 | −6.1622E−01 |
| A4= −5.4734E−02 | 3.6931E−02 | −5.4472E−02 | −6.1368E−02 |
| A6= 1.1650E−02 | −3.3641E−02 | 7.8021E−03 | 1.2322E−02 |
| A8= −9.0946E−03 | 1.1531E−02 | −5.1916E−04 | −2.1313E−03 |

TABLE 5-continued

| Aspheric Coefficients | | | |
|---|---|---|---|
| A10= | 4.9623E−03 | −2.4735E−03 | 9.7796E−05 | 3.0832E−04 |
| A12= | −1.6027E−03 | 3.2892E−04 | −2.0554E−05 | −3.2474E−05 |
| A14= | 3.0155E−04 | −2.5844E−05 | 2.2120E−06 | 2.2417E−06 |
| A16= | −3.2396E−05 | 1.0858E−06 | −1.2676E−07 | −9.4967E−08 |
| A18= | 1.8487E−06 | −1.7537E−08 | 3.7712E−09 | 2.2441E−09 |
| A20= | −4.3604E−08 | −7.7794E−11 | −4.6165E−11 | −2.2732E−11 |

In the 2nd embodiment, the equation of the aspheric surface profiles of the aforementioned lens elements is the same as the equation of the 1st embodiment. Also, the rest optical data of the optical photographing lens assembly are disclosed in Table 6 below. Moreover, the definitions of these parameters shown in Table 6 are the same as those stated in the 1st embodiment with corresponding values for the 2nd embodiment. In particular, in this embodiment, a surface of the optical photographing lens assembly closest to the object side is an object-side surface 281a of the transparent substrate 280a, so TOB is an axial distance between an imaged object and the object-side surface 281a of the transparent substrate 280a, and TL is an axial distance between the object-side surface 281a of the transparent substrate 280a and the image surface 295.

TABLE 6

| 2nd Embodiment | | | | |
|---|---|---|---|---|
| | Mode 1 | Mode 2 | | |
| f [mm] | 6.63 | 4.41 | Nimax | 1.669 |
| Fno | 1.79 | 1.11 | NL | 1.300, 1.300 |
| HFOV [deg.] | 39.9 | 35.7 | Vimin | 19.4 |
| TOB [mm] | ∞ | ∞ | Vimin/Nimax | 11.65 |
| TS2 [mm] | 0.500 | 0.600 | VL | 92.7, 92.7 |
| TS3 [mm] | 0.150 | 0.050 | ΣCTi/ΣATi | 1.67 |
| TS5 [mm] | 0.500 | 0.600 | TLi [mm] | 7.492 |
| TS6 [mm] | 0.959 | 0.859 | SDi/TDi | 0.87 |
| RS3 [mm] | ∞ | −12.769 | |RLr1r|/TDi | 0.63 |
| RS6 [mm] | ∞ | −12.769 | fmax/fmin | 1.51 |
| ft [mm] | ∞ | 21.45 | LNi | 7 |
| CTL [mm] | 0.500, 0.500 | 0.600, 0.600 | TDi/YCLr1r | 5.19 |
| CTL/DL | 1.39, 1.39 | 2.31, 2.31 | — | — |
| Dt [mm] | 1.570 | 1.670 | — | — |
| TDi/BL | 6.15 | 6.15 | — | — |
| TDi/Dt | 4.10 | 3.86 | — | — |
| TDi/f | 0.97 | 1.46 | — | — |
| TDi/ImgH | 1.14 | 1.14 | — | — |
| TL [mm] | 9.212 | 9.212 | — | — |
| TLi/EPD | 2.02 | 1.89 | — | — |
| TLi/f | 1.13 | 1.70 | — | — |
| |f/ft| | 0.00 | 0.21 | — | — |
| CRA [deg.] | 35.1 | 35.1 | | |
| ImgH/BL | 5.38 | 5.38 | | |
| YLr1r/YLf1f | 2.37 | 2.41 | | |

3rd Embodiment

Figure 3:
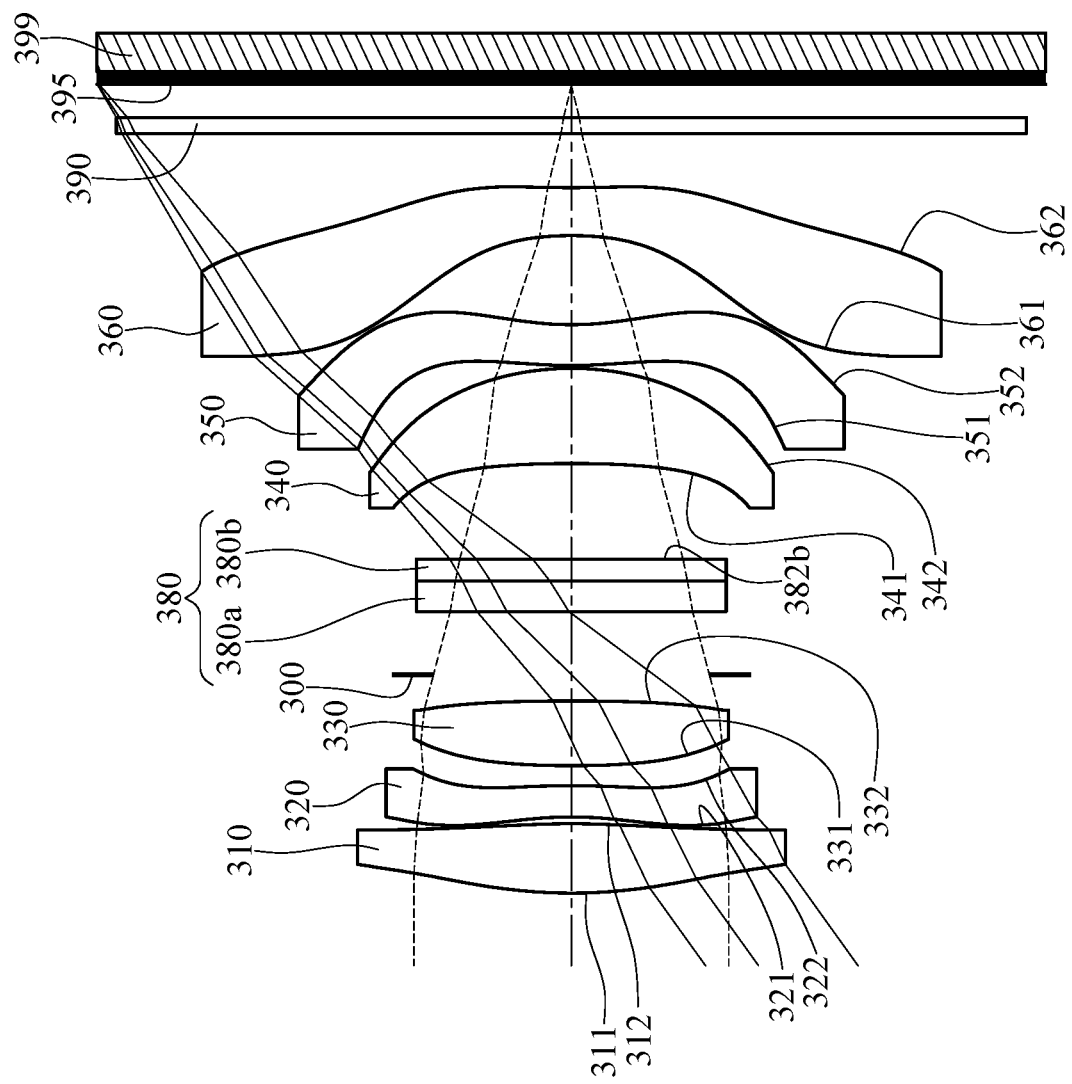
FIG. 3 is a schematic view of an image capturing unit in Mode 1 according to the 3rd embodiment of the present disclosure.

FIG. 3 is a schematic view of an image capturing unit in Mode 1 according to the 3rd embodiment of the present disclosure. In FIG. 3, the image capturing unit includes the optical photographing lens assembly (its reference numeral is omitted) of the present disclosure and an image sensor 399. The optical photographing lens assembly includes an imaging lens system (its reference numeral is omitted), an aperture stop 300, a focus tunable component 380, a filter 390 and an image surface 395. The imaging lens system includes a first lens element 310, a second lens element 320, a third lens element 330, a fourth lens element 340, a fifth lens element 350 and a sixth lens element 360. Further, the aforementioned components of the optical photographing lens assembly are arranged in order from an object side to an image side as follows: the first lens element 310, the second lens element 320, the third lens element 330, the aperture stop 300, the focus tunable component 380, the fourth lens element 340, the fifth lens element 350, the sixth lens element 360, the filter 390 and the image surface 395. In addition, the imaging lens system has a configuration including a first lens group and a second lens group. Specifically, the imaging lens system includes, in order from the object side to the image side, the first lens group and the second lens group. The first lens group includes, in order from the object side to the image side, an object-side first lens element (the first lens element 310) and an object-side second lens element (the second lens element 320), and the second lens group includes, in order from the image side to the object side, an image-side first lens element (the sixth lens element 360) and an image-side second lens element (the fifth lens element 350). The imaging lens system includes six lens elements (310, 320, 330, 340, 350 and 360) with no additional lens element disposed between each of the adjacent six lens elements.

The first lens element 310 with positive refractive power has an object-side surface 311 being convex in a paraxial region thereof and an image-side surface 312 being convex in a paraxial region thereof. The first lens element 310 is made of plastic material and has the object-side surface 311 and the image-side surface 312 being both aspheric. The object-side surface 311 of the first lens element 310 has at least one inflection point. The image-side surface 312 of the first lens element 310 has at least one inflection point.

The second lens element 320 with negative refractive power has an object-side surface 321 being concave in a paraxial region thereof and an image-side surface 322 being convex in a paraxial region thereof. The second lens element 320 is made of plastic material and has the object-side surface 321 and the image-side surface 322 being both aspheric. The object-side surface 321 of the second lens element 320 has at least one inflection point. The image-side surface 322 of the second lens element 320 has at least one inflection point.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric. The image-side surface 342 of the fourth lens element 340 has at least one inflection point.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. The object-side surface 351 of the fifth lens element 350 has at least one inflection point. The image-side surface 352 of the fifth lens element 350 has at least one inflection point. The object-side surface 351 of the fifth lens element 350 has at least one critical point in an off-axis region thereof. The image-side surface 352 of the fifth lens element 350 has at least one critical point in an off-axis region thereof.

The sixth lens element 360 with negative refractive power has an object-side surface 361 being concave in a paraxial region thereof and an image-side surface 362 being concave in a paraxial region thereof. The sixth lens element 360 is made of plastic material and has the object-side surface 361 and the image-side surface 362 being both aspheric. The object-side surface 361 of the sixth lens element 360 has at least one inflection point. The image-side surface 362 of the sixth lens element 360 has at least one inflection point. The image-side surface 362 of the sixth lens element 360 has at least one critical point in an off-axis region thereof.

The focus tunable component 380 includes a liquid lens set (its reference numeral is omitted), and the liquid lens set includes a transparent substrate 380a, a liquid material 380b, a flexible membrane (not shown in FIG. 3) and a piezo film (not shown in FIG. 3). The liquid material 380b is disposed on an image-side surface of the transparent substrate 380a, and the transparent substrate 380a is made of glass material. The focus tunable component 380 is disposed between the third lens element 330 and the fourth lens element 340 for tuning its focal length in accordance with different conditions by changing a central thickness of the liquid material 380b and a curvature radius of the image-side surface 382b of the liquid material 380b so as to adjust the focal length of the optical photographing lens assembly.

The filter 390 is made of glass material and located between the sixth lens element 360 and the image surface 395, and will not affect the focal length of the optical photographing lens assembly. The image sensor 399 is disposed on or near the image surface 395 of the optical photographing lens assembly.

In this embodiment, two of various modes of the optical photographing lens assembly are provided according to different focusing conditions. The detailed optical data of the 3rd embodiment are shown in Table 7 and the aspheric surface data are shown in Table 8 below. In this embodiment, the central thickness of the liquid material 380b is TS9, an axial distance between the liquid material 380b and the fourth lens element 340 is TS10, and the curvature radius of the image-side surface 382b of the liquid material 380b is RS10.

TABLE 7

3rd Embodiment

| Surface # | | Curvature Radius | Thickness | Material | Index | Abbe # | Focal Length |
|---|---|---|---|---|---|---|---|
| 0 | Object | Plano | TOB | | | | |
| 1 | Lens 1 | 3.547 (ASP) | 0.478 | Plastic | 1.545 | 56.1 | 4.07 |
| 2 | | −5.635 (ASP) | 0.047 | | | | |
| 3 | Lens 2 | −2.351 (ASP) | 0.216 | Plastic | 1.639 | 23.3 | −8.27 |
| 4 | | −4.390 (ASP) | 0.137 | | | | |
| 5 | Lens 3 | 7.237 (ASP) | 0.446 | Plastic | 1.544 | 56.0 | 9.24 |
| 6 | | −16.096 (ASP) | 0.180 | | | | |
| 7 | Ape. Stop | Plano | 0.436 | | | | |
| 8 | Focus Tunable Component | Plano | 0.210 | Glass | 1.513 | 56.9 | |
| 9 | | Plano | TS9 | Liquid Material | 1.300 | 92.7 | |
| 10 | | RS10 | TS10 | | | | |
| 11 | Lens 4 | −7.835 (ASP) | 0.655 | Plastic | 1.562 | 44.6 | 4.77 |
| 12 | | −2.055 (ASP) | 0.020 | | | | |
| 13 | Lens 5 | 3.270 (ASP) | 0.281 | Plastic | 1.642 | 22.5 | −9.74 |
| 14 | | 2.074 (ASP) | 0.614 | | | | |
| 15 | Lens 6 | −2.283 (ASP) | 0.330 | Plastic | 1.544 | 56.0 | −3.04 |
| 16 | | 6.299 (ASP) | 0.373 | | | | |
| 17 | Filter | Plano | 0.110 | Glass | 1.517 | 64.2 | — |
| 18 | | Plano | 0.229 | | | | |
| 19 | Image | Plano | — | | | | |

Note:
Reference wavelength is 587.6 nm (d-line).
An effective radius of the image-side surface 322 (Surface 4) is 1.090 mm.
An effective radius of the object-side surface 351 (Surface 13) is 1.470 mm.

TABLE 8

Aspheric Coefficients

| | Surface # | | | | | |
|---|---|---|---|---|---|---|
| | 1 | 2 | 3 | 4 | 5 | 6 |
| k= | −5.6652E+00 | −8.9198E+01 | −2.4557E+01 | −8.9565E+01 | 4.2223E+00 | −4.1448E+01 |
| A4= | 8.4455E−04 | 5.2912E−02 | 7.5446E−02 | 1.2557E−01 | 7.3967E−02 | −3.2496E−02 |
| A6= | 1.2735E−02 | −3.9003E−02 | 2.7401E−02 | 2.5402E−02 | 2.1616E−03 | 1.8168E−02 |
| A8= | −4.0892E−02 | 7.2752E−04 | −3.1549E−02 | 3.7933E−03 | −2.1461E−03 | −2.7688E−02 |

TABLE 8-continued

| Aspheric Coefficients | | | | | |
|---|---|---|---|---|---|
| A10= | 2.4012E−02 | 1.2439E−02 | 1.3894E−02 | −1.6987E−02 | 2.9746E−03 | 2.3963E−02 |
| A12= | −4.2719E−03 | −4.0212E−03 | −3.9859E−03 | 1.7457E−03 | −3.3817E−03 | −8.3665E−03 |

| | Surface # | | | | | |
|---|---|---|---|---|---|---|
| | 11 | 12 | 13 | 14 | 15 | 16 |
| k= | −6.8746E+01 | −8.3583E+00 | −6.2428E+01 | −1.2021E+01 | −2.1352E+00 | 3.6732E+00 |
| A4= | −8.4855E−02 | −2.2117E−01 | −6.3449E−02 | −4.4072E−02 | −3.3068E−01 | −2.9094E−01 |
| A6= | 1.5151E−01 | 3.4725E−01 | −3.8661E−02 | −9.9409E−02 | 2.4258E−01 | 1.8612E−01 |
| A8= | −3.3353E−01 | −5.0384E−01 | −8.0416E−02 | 8.5786E−02 | −7.2836E−02 | −6.5325E−02 |
| A10= | 3.2065E−01 | 3.9366E−01 | 1.2081E−01 | −3.5522E−02 | 1.0362E−02 | 1.3993E−02 |
| A12= | −1.6317E−01 | −1.5914E−01 | −6.2459E−02 | 7.3427E−03 | −4.2194E−04 | −1.8514E−03 |
| A14= | 3.2894E−02 | 2.5914E−02 | 1.0858E−02 | −5.9068E−04 | −5.1143E−05 | 1.3986E−04 |
| A16= | — | — | — | — | 4.4400E−06 | −4.6388E−06 |

In the 3rd embodiment, the equation of the aspheric surface profiles of the aforementioned lens elements is the same as the equation of the 1st embodiment. Also, the rest optical data of the optical photographing lens assembly are disclosed in Table 9 below. Moreover, the definitions of these parameters shown in Table 9 are the same as those stated in the 1st embodiment with corresponding values for the 3rd embodiment. In particular, in this embodiment, a surface of the optical photographing lens assembly closest to the object side is the object-side surface 311 of the first lens element 310, and an image-side surface of the image-side first lens element is the image-side surface 362 of the sixth lens element 360, so TOB is an axial distance between an imaged object and the object-side surface 311 of the first lens element 310, TDi is an axial distance between the object-side surface 311 of the first lens element 310 and the image-side surface 362 of the sixth lens element 360, BL is an axial distance between the image-side surface 362 of the sixth lens element 360 and the image surface 395, TL is an axial distance between the object-side surface 311 of the first lens element 310 and the image surface 395, YLr1r is a maximum effective radius of the image-side surface 362 of the sixth lens element 360, SDi is an axial distance between the aperture stop 300 and the image-side surface 362 of the sixth lens element 360, RLr1r a curvature radius of the image-side surface 362 of the sixth lens element 360, and YCLr1r is a vertical distance between the non-axial critical point on the image-side surface 362 of the sixth lens element 360 and the optical axis.

TABLE 9

| 3rd Embodiment | | | | | |
|---|---|---|---|---|---|
| | Mode 1 | Mode 2 | | | |
| f [mm] | 4.51 | 3.74 | Nimax | 1.642 | |
| Fno | 2.08 | 1.74 | NL | 1.300 | |
| HFOV [deg.] | 35.6 | 36.9 | Vimin | 22.5 | |
| TOB [mm] | ∞ | 1000.000 | Vimin/Nimax | 13.70 | |
| TS9 [mm] | 0.151 | 0.191 | VL | 92.7 | |
| TS10 [mm] | 0.659 | 0.619 | ΣCTi/ΣATi | 0.98 | |
| RS10 [mm] | ∞ | −6.500 | TLi [mm] | 5.572 | |
| ft [mm] | ∞ | 21.67 | SDi/TDi | 0.69 | |
| CTL [mm] | 0.151 | 0.191 | |RLr1r|/TDi | 1.30 | |
| Dt [mm] | 0.361 | 0.401 | fmax/fmin | 1.20 | |
| TDi/BL | 6.82 | 6.82 | LNi | 6 | |
| TDi/Dt | 13.46 | 12.12 | TDi/YCLr1r | 12.12 | |
| TDi/f | 1.08 | 1.30 | — | — | |
| TDi/ImgH | 1.49 | 1.49 | — | — | |
| TL [mm] | 5.572 | 5.572 | — | — | |
| TLi/EPD | 2.57 | 2.57 | — | — | |

TABLE 9-continued

| 3rd Embodiment | | | |
|---|---|---|---|
| | Mode 1 | Mode 2 | |
| TLi/f | 1.24 | 1.49 | — — |
| |f/ft| | 0.00 | 0.17 | — — |
| CRA [deg.] | 33.5 | 32.7 | — — |
| ImgH/BL | 4.58 | 4.58 | — — |
| YLr1r/YLf1f | 1.73 | 1.71 | — — |

4th Embodiment

Figure 4:
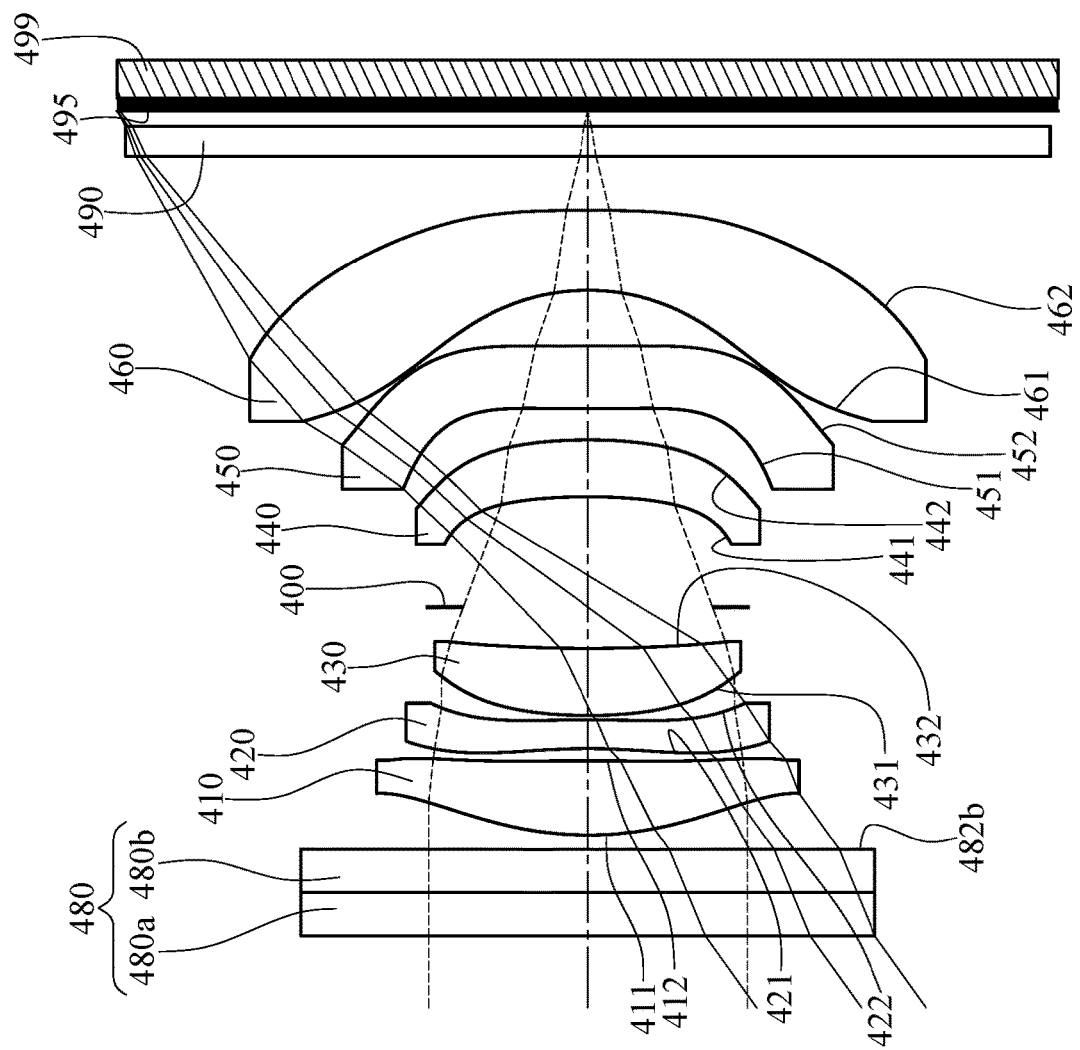
FIG. 4 is a schematic view of an image capturing unit in Mode 1 according to the 4th embodiment of the present disclosure.

FIG. 4 is a schematic view of an image capturing unit in Mode 1 according to the 4th embodiment of the present disclosure. In FIG. 4, the image capturing unit includes the optical photographing lens assembly (its reference numeral is omitted) of the present disclosure and an image sensor 499. The optical photographing lens assembly includes a focus tunable component 480, an imaging lens system (its reference numeral is omitted), an aperture stop 400, a filter 490 and an image surface 495. The imaging lens system includes a first lens element 410, a second lens element 420, a third lens element 430, a fourth lens element 440, a fifth lens element 450 and a sixth lens element 460. Further, the aforementioned components of the optical photographing lens assembly are arranged in order from an object side to an image side as follows: the focus tunable component 480, the first lens element 410, the second lens element 420, the third lens element 430, the aperture stop 400, the fourth lens element 440, the fifth lens element 450, the sixth lens element 460, the filter 490 and the image surface 495. In addition, the imaging lens system has a configuration including a first lens group and a second lens group. Specifically, the imaging lens system includes, in order from the object side to the image side, the first lens group and the second lens group. The first lens group includes, in order from the object side to the image side, an object-side first lens element (the first lens element 410) and an object-side second lens element (the second lens element 420), and the second lens group includes, in order from the image side to the object side, an image-side first lens element (the sixth lens element 460) and an image-side second lens element (the fifth lens element 450). The imaging lens system includes six lens elements (410, 420, 430, 440, 450 and 460) with no additional lens element disposed between each of the adjacent six lens elements.

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric. The object-side surface 411 of the first lens element 410 has at least one inflection point. The image-side surface 412 of the first lens element 410 has at least one inflection point.

The second lens element 420 with negative refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric. The object-side surface 421 of the second lens element 420 has at least one inflection point. The image-side surface 422 of the second lens element 420 has at least one inflection point.

The third lens element 430 with positive refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. The image-side surface 432 of the third lens element 430 has at least one inflection point.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with positive refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The object-side surface 451 of the fifth lens element 450 has at least one inflection point. The image-side surface 452 of the fifth lens element 450 has at least one inflection point. The object-side surface 451 of the fifth lens element 450 has at least one critical point in an off-axis region thereof. The image-side surface 452 of the fifth lens element 450 has at least one critical point in an off-axis region thereof.

The sixth lens element 460 with negative refractive power has an object-side surface 461 being concave in a paraxial region thereof and an image-side surface 462 being convex in a paraxial region thereof. The sixth lens element 460 is made of plastic material and has the object-side surface 461 and the image-side surface 462 being both aspheric. The object-side surface 461 of the sixth lens element 460 has at least one inflection point.

The focus tunable component 480 includes a liquid lens set (its reference numeral is omitted), and the liquid lens set includes a transparent substrate 480a, a liquid material 480b, a flexible membrane (not shown in FIG. 4) and a piezo film (not shown in FIG. 4). The liquid material 480b is disposed on an image-side surface of the transparent substrate 480a, and the transparent substrate 480a is made of glass material. The focus tunable component 480 is disposed between an imaged object and the imaging lens system for tuning its focal length in accordance with different conditions by changing a curvature radius of an image-side surface 482b of the liquid material 480b so as to adjust the focal length of the optical photographing lens assembly.

The filter 490 is made of glass material and located between the sixth lens element 460 and the image surface 495, and will not affect the focal length of the optical photographing lens assembly. The image sensor 499 is disposed on or near the image surface 495 of the optical photographing lens assembly.

In this embodiment, two of various modes of the optical photographing lens assembly are provided according to different focusing conditions. The detailed optical data of the 4th embodiment are shown in Table 10 and the aspheric surface data are shown in Table 11 below. In this embodiment, the curvature radius of the image-side surface 482b of the liquid material 480b is RS3.

TABLE 10

4th Embodiment

| Surface # | | Curvature Radius | Thickness | Material | Index | Abbe # | Focal Length |
|---|---|---|---|---|---|---|---|
| 0 | Object | Plano | TOB | | | | |
| 1 | Focus Tunable Component | Plano | 0.300 | Glass | 1.517 | 64.2 | |
| 2 | | Plano | 0.300 | Liquid Material | 1.525 | 54.4 | |
| 3 | | RS3 | 0.100 | | | | |
| 4 | Lens 1 | 2.316 (ASP) | 0.514 | Plastic | 1.545 | 56.1 | 3.98 |
| 5 | | −31.112 (ASP) | 0.084 | | | | |
| 6 | Lens 2 | −4.242 (ASP) | 0.200 | Plastic | 1.686 | 18.4 | −10.36 |
| 7 | | −10.717 (ASP) | 0.030 | | | | |
| 8 | Lens 3 | 3.310 (ASP) | 0.465 | Plastic | 1.544 | 56.0 | 8.54 |
| 9 | | 10.935 (ASP) | 0.287 | | | | |
| 10 | Ape. Stop | Plano | 0.766 | | | | |
| 11 | Lens 4 | −4.210 (ASP) | 0.395 | Plastic | 1.544 | 56.0 | 28.14 |
| 12 | | −3.411 (ASP) | 0.216 | | | | |
| 13 | Lens 5 | 13.409 (ASP) | 0.433 | Plastic | 1.614 | 26.0 | 44.39 |
| 14 | | 26.078 (ASP) | 0.388 | | | | |
| 15 | Lens 6 | −1.516 (ASP) | 0.557 | Plastic | 1.544 | 56.0 | −3.22 |
| 16 | | −12.610 (ASP) | 0.373 | | | | |
| 17 | Filter | Plano | 0.210 | Glass | 1.517 | 64.2 | — |
| 18 | | Plano | 0.104 | | | | |
| 19 | Image | Plano | — | | | | |

Note:
Reference wavelength is 587.6 nm (d-line).
An effective radius of the image-side surface 422 (Surface 7) is 1.090 mm.
An effective radius of the object-side surface 451 (Surface 13) is 1.280 mm.

TABLE 11

Aspheric Coefficients

| Surface # | | | | | |
|---|---|---|---|---|---|
| 4 | 5 | 6 | 7 | 8 | 9 |
| k= −4.7913E+00 | −5.3690E+01 | −3.1316E+01 | 5.3867E+01 | 3.6957E+00 | 8.2650E+01 |
| A4= 2.2607E−02 | 2.5287E−02 | 6.7186E−02 | 1.1535E−01 | 3.4841E−02 | −6.5966E−03 |
| A6= −1.3618E−02 | 2.5037E−02 | 4.0937E−02 | 6.3158E−02 | 1.4866E−01 | −2.2484E−02 |
| A8= −4.2391E−03 | −3.2750E−02 | −4.5857E−02 | −6.1214E−02 | −1.6666E−01 | 6.6094E−02 |
| A10= 1.6945E−03 | 1.0104E−02 | 1.6375E−02 | 6.4866E−03 | 9.8535E−02 | −5.9615E−02 |
| A12= −2.6780E−04 | −1.1306E−03 | −1.6068E−03 | 7.5144E−03 | −2.7541E−02 | 1.0602E−02 |

| Surface # | | | | | |
|---|---|---|---|---|---|
| 11 | 12 | 13 | 14 | 15 | 16 |
| k= 1.5796E+01 | −4.8674E+00 | −9.0176E+01 | −5.4566E+01 | −2.6737E+00 | −1.4970E+00 |
| A4= −8.9347E−03 | −3.2140E−02 | −6.8243E−02 | −4.3905E−02 | −1.3053E−01 | −7.3313E−02 |
| A6= −2.2279E−01 | −3.1073E−01 | −1.9967E−01 | −8.9216E−02 | 1.0715E−02 | 4.9058E−03 |
| A8= 4.7339E−01 | 5.1798E−01 | 2.0639E−01 | 6.4304E−02 | 5.3540E−02 | 1.5028E−02 |
| A10= −8.7785E−01 | −5.4231E−01 | −1.5346E−01 | −2.6195E−02 | −2.8680E−02 | −7.7073E−03 |
| A12= 7.8342E−01 | 2.8217E−01 | 5.3196E−02 | 5.8080E−03 | 6.5296E−03 | 1.6596E−03 |
| A14= −2.9218E−01 | −5.3864E−02 | −8.0045E−03 | −4.7902E−04 | −7.1752E−04 | −1.7023E−04 |
| A16= — | — | — | — | 3.1229E−05 | 6.6803E−06 |

In the 4th embodiment, the equation of the aspheric surface profiles of the aforementioned lens elements is the same as the equation of the 1st embodiment. Also, the rest optical data of the optical photographing lens assembly are disclosed in Table 12 below. Moreover, the definitions of these parameters shown in Table 12 are the same as those stated in the 1st embodiment and 3rd embodiment with corresponding values for the 4th embodiment, so an explanation in this regard will not be provided again.

TABLE 12

4th Embodiment

| | Mode 1 | Mode 2 | | |
|---|---|---|---|---|
| f [mm] | 4.59 | 3.51 | Nimax | 1.686 |
| Fno | 2.08 | 1.51 | NL | 1.525 |
| HFOV [deg.] | 35.5 | 31.2 | Vimin | 18.4 |
| TOB [mm] | ∞ | 800.000 | Vimin/Nimax | 10.90 |
| RS3 [mm] | ∞ | −13.169 | VL | 54.4 |
| ft [mm] | ∞ | 25.08 | ΣCTi/ΣATi | 1.45 |
| CTL [mm] | 0.300 | 0.300 | TLi [mm] | 5.022 |
| Dt [mm] | 0.600 | 0.600 | SDi/TDi | 0.64 |
| TDi/BL | 6.31 | 6.31 | |RLr1r|/TDi | 2.91 |
| TDi/Dt | 7.23 | 7.23 | fmax/fmin | 1.31 |
| TDi/f | 0.94 | 1.23 | LNi | 6 |
| TDi/ImgH | 1.33 | 1.33 | — | — |
| TL [mm] | 5.722 | 5.722 | — | — |
| TLi/EPD | 2.27 | 2.14 | — | — |
| TLi/f | 1.09 | 1.43 | — | — |
| |f/ft| | 0.00 | 0.14 | — | — |
| CRA [deg.] | 35.3 | 35.3 | — | — |
| ImgH/BL | 4.74 | 4.74 | — | — |
| YLr1r/YLf1f | 1.60 | 1.59 | — | — |

5th Embodiment

Figure 5:
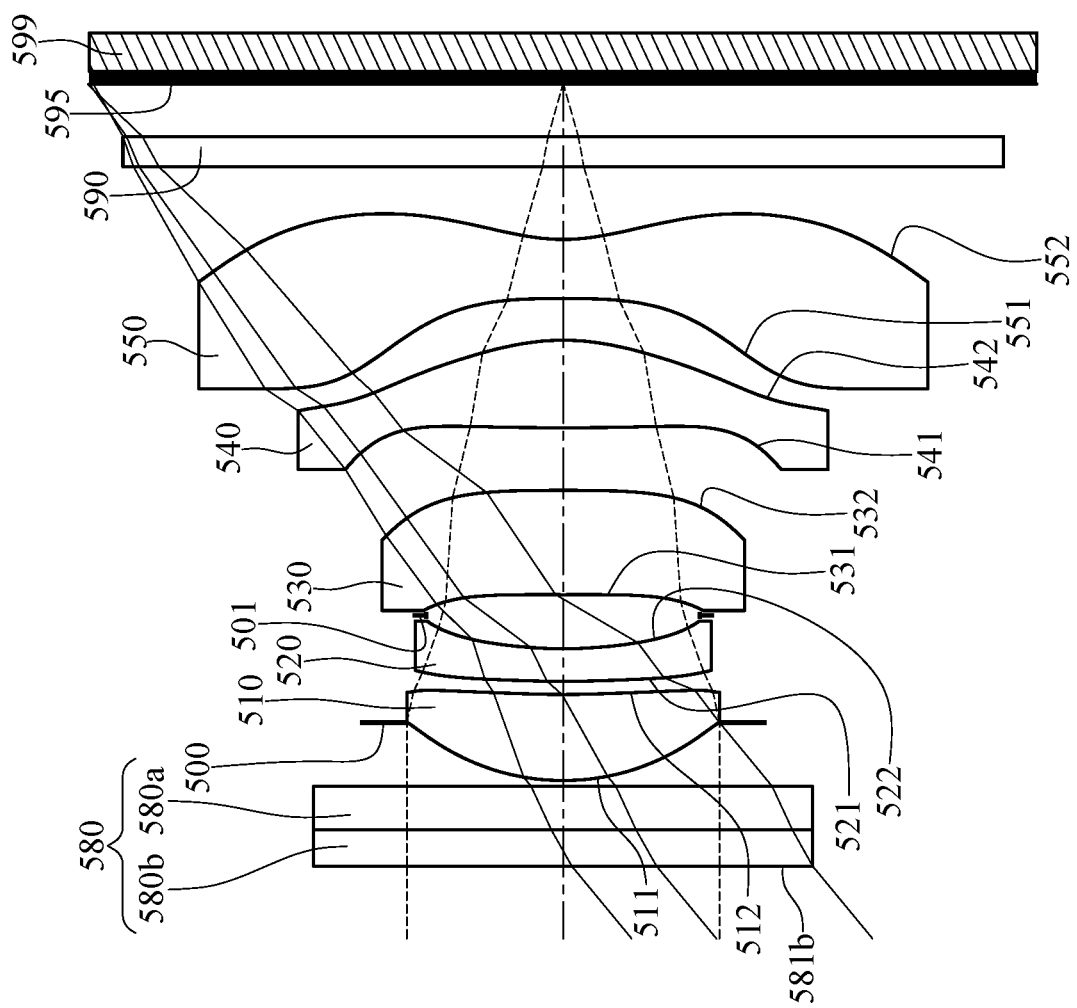
FIG. 5 is a schematic view of an image capturing unit in Mode 1 according to the 5th embodiment of the present disclosure.

FIG. 5 is a schematic view of an image capturing unit in Mode 1 according to the 5th embodiment of the present disclosure. In FIG. 5, the image capturing unit includes the optical photographing lens assembly (its reference numeral is omitted) of the present disclosure and an image sensor 599. The optical photographing lens assembly includes a focus tunable component 580, an aperture stop 500, an imaging lens system (its reference numeral is omitted), a stop 501, a filter 590 and an image surface 595. The imaging lens system includes a first lens element 510, a second lens element 520, a third lens element 530, a fourth lens element 540 and a fifth lens element 550. Further, the aforementioned components of the optical photographing lens assembly are arranged in order from an object side to an image side as follows: the focus tunable component 580, the aperture stop 500, the first lens element 510, the second lens element 520, the stop 501, the third lens element 530, the fourth lens element 540, the fifth lens element 550, the filter 590 and the image surface 595. In addition, the imaging lens system has a configuration including a first lens group and a second lens group. Specifically, the imaging lens system includes, in order from the object side to the image side, the first lens group and the second lens group. The first lens group includes, in order from the object side to the image side, an object-side first lens element (the first lens element 510) and an object-side second lens element (the second lens element 520), and the second lens group includes, in order from the image side to the object side, an image-side first lens element (the fifth lens element 550) and an image-side second lens element (the fourth lens element 540). The imaging lens system includes five lens elements (510, 520, 530, 540 and 550) with no additional lens element disposed between each of the adjacent five lens elements.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric. The object-side surface 511 of the first lens element 510 has at least one inflection point. The image-side surface 512 of the first lens element 510 has at least one inflection point.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric. The object-side surface 531 of the third lens element 530 has at least one inflection point. The image-side surface 532 of the third lens element 530 has at least one inflection point.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric. The object-side surface 541 of the fourth lens element 540 has at least one inflection point. The image-side surface 542 of the fourth lens element 540 has at least one inflection point. The object-side surface 541 of the fourth lens element 540 has at least one critical point in an off-axis region thereof.

The fifth lens element 550 with negative refractive power has an object-side surface 551 being concave in a paraxial region thereof and an image-side surface 552 being concave in a paraxial region thereof. The fifth lens element 550 is made of plastic material and has the object-side surface 551 and the image-side surface 552 being both aspheric. The object-side surface 551 of the fifth lens element 550 has at least one inflection point. The image-side surface 552 of the fifth lens element 550 has at least one inflection point. The image-side surface 552 of the fifth lens element 550 has at least one critical point in an off-axis region thereof.

The focus tunable component 580 includes a liquid lens set (its reference numeral is omitted), and the liquid lens set includes a liquid material 580b, a transparent substrate 580a, a flexible membrane (not shown in FIG. 5) and a piezo film (not shown in FIG. 5). The liquid material 580b is disposed on an object-side surface of the transparent substrate 580a, and the transparent substrate 580a is made of glass material. The focus tunable component 580 is disposed between an imaged object and the imaging lens system for tuning its focal length in accordance with different conditions by changing a central thickness of the liquid material 580b and a curvature radius of an object-side surface 581b of the liquid material 580b so as to adjust the focal length of the optical photographing lens assembly.

The filter 590 is made of glass material and located between the fifth lens element 550 and the image surface 595, and will not affect the focal length of the optical photographing lens assembly. The image sensor 599 is disposed on or near the image surface 595 of the optical photographing lens assembly.

In this embodiment, two of various modes of the optical photographing lens assembly are provided according to different focusing conditions. The detailed optical data of the 5th embodiment are shown in Table 13 and the aspheric surface data are shown in Table 14 below. In this embodiment, the central thickness of the liquid material 580b is TS1, and the curvature radius of the object-side surface 581b of the liquid material 580b is RS1.

TABLE 13

5th Embodiment

| Surface # | | Curvature Radius | Thickness | Material | Index | Abbe # | Focal Length |
|---|---|---|---|---|---|---|---|
| 0 | Object | Plano | TOB | | | | |
| 1 | Focus Tunable Component | RS1 | TS1 | Liquid Material | 1.300 | 92.7 | |
| 2 | | Plano | 0.300 | Glass | 1.513 | 56.9 | |
| 3 | | Plano | 0.440 | | | | |
| 4 | Ape. Stop | Plano | −0.400 | | | | |
| 5 | Lens 1 | 1.585 (ASP) | 0.593 | Plastic | 1.545 | 56.1 | 3.71 |
| 6 | | 6.363 (ASP) | 0.090 | | | | |
| 7 | Lens 2 | 5.546 (ASP) | 0.225 | Plastic | 1.686 | 18.4 | −9.06 |
| 8 | | 2.883 (ASP) | 0.230 | | | | |
| 9 | Stop | Plano | 0.143 | | | | |
| 10 | Lens 3 | 59.807 (ASP) | 0.719 | Plastic | 1.544 | 56.0 | 26.85 |
| 11 | | −19.251 (ASP) | 0.431 | | | | |
| 12 | Lens 4 | 24.015 (ASP) | 0.603 | Plastic | 1.544 | 56.0 | 2.70 |
| 13 | | −1.553 (ASP) | 0.288 | | | | |
| 14 | Lens 5 | −8.989 (ASP) | 0.406 | Plastic | 1.534 | 55.9 | −2.08 |
| 15 | | 1.287 (ASP) | 0.500 | | | | |
| 16 | Filter | Plano | 0.210 | Glass | 1.517 | 64.2 | — |
| 17 | | Plano | 0.361 | | | | |
| 18 | Image | Plano | — | | | | |

Note:
Reference wavelength is 587.6 nm (d-line).
An effective radius of the stop 501 (Surface 9) is 0.941 mm.

TABLE 14

Aspheric Coefficients

| | Surface # | | | | |
|---|---|---|---|---|---|
| | 5 | 6 | 7 | 8 | 10 |
| k= | −1.9817E+00 | 1.3025E+01 | 2.0110E+01 | −3.5978E+00 | 9.0000E+01 |
| A4= | 5.8602E−02 | −1.4793E−01 | −2.4771E−01 | −1.1115E−01 | −1.2867E−01 |
| A6= | 2.9030E−02 | 1.9501E−01 | 4.8002E−01 | 3.5484E−01 | 6.3863E−02 |

TABLE 14-continued

Aspheric Coefficients

| | | | | | |
|---|---|---|---|---|---|
| A8= | −1.0831E−01 | −6.1090E−02 | −4.5480E−01 | −3.0672E−01 | −2.0697E−01 |
| A10= | 2.5544E−01 | −1.9239E−01 | 2.4638E−01 | 1.4696E−01 | 3.4807E−01 |
| A12= | −3.4606E−01 | 2.8618E−01 | −7.8875E−02 | −2.4208E−03 | −3.5738E−01 |
| A14= | 2.4703E−01 | −1.8510E−01 | 1.0779E−02 | — | 1.4188E−01 |
| A16= | −7.5574E−02 | 4.3665E−02 | — | — | — |

| | Surface # | | | | |
|---|---|---|---|---|---|
| | 11 | 12 | 13 | 14 | 15 |
| k= | −8.9533E+01 | 3.4190E+01 | −9.9170E+00 | 7.5059E+00 | −7.6724E+00 |
| A4= | −9.6972E−02 | 6.2260E−03 | −1.1705E−01 | −2.7412E−01 | −1.2169E−01 |
| A6= | −2.1884E−02 | 1.2844E−02 | 2.4357E−01 | 2.7831E−01 | 7.9483E−02 |
| A8= | 4.3463E−03 | −9.5808E−02 | −2.8987E−01 | −3.1870E−01 | −4.8211E−02 |
| A10= | −2.4397E−02 | 8.9642E−02 | 1.7845E−01 | 2.4439E−01 | 2.1730E−02 |
| A12= | 4.2434E−02 | −4.6596E−02 | −5.4295E−02 | −1.0687E−01 | −6.5642E−03 |
| A14= | −3.0718E−02 | 1.2934E−02 | 6.0899E−03 | 2.7426E−02 | 1.2706E−03 |
| A16= | 8.2602E−03 | −1.4591E−03 | 6.8164E−04 | −4.1315E−03 | −1.5108E−04 |
| A18= | — | — | −2.3558E−04 | 3.3975E−04 | 1.0066E−05 |
| A20= | — | — | 1.6632E−05 | −1.1804E−05 | −2.8826E−07 |

In the 5th embodiment, the equation of the aspheric surface profiles of the aforementioned lens elements is the same as the equation of the 1st embodiment. Also, the rest optical data of the optical photographing lens assembly are disclosed in Table 15 below. Moreover, the definitions of these parameters shown in Table 15 are the same as those stated in the 1st embodiment with corresponding values for the 5th embodiment. In particular, in this embodiment, a surface of the optical photographing lens assembly closest to the object side is the object-side surface 581b of the liquid material 580b, and an image-side surface of the image-side first lens element is the image-side surface 552 of the fifth lens element 550, so TOB is an axial distance between an imaged object and the object-side surface 581b of the liquid material 580b, TDi is an axial distance between the object-side surface 511 of the first lens element 510 and the image-side surface 552 of the fifth lens element 550, BL is an axial distance between the image-side surface 552 of the fifth lens element 550 and the image surface 595, TL is an axial distance between the object-side surface 581b of the liquid material 580b and the image surface 595, YLr1r is a maximum effective radius of the image-side surface 552 of the fifth lens element 550, SDi is an axial distance between the aperture stop 500 and the image-side surface 552 of the fifth lens element 550, RLr1r is a curvature radius of the image-side surface 552 of the fifth lens element 550, and YCLr1r is a vertical distance between the non-axial critical point on the image-side surface 552 of the fifth lens element 550 and the optical axis.

TABLE 15

5th Embodiment

| | Mode 1 | Mode 2 | | |
|---|---|---|---|---|
| f [mm] | 3.89 | 3.30 | Nimax | 1.686 |
| Fno | 1.81 | 1.49 | NL | 1.300 |
| HFOV [deg.] | 39.5 | 37.5 | Vimin | 18.4 |
| TOB [mm] | ∞ | ∞ | Vimin/Nimax | 10.90 |
| TS1 [mm] | 0.250 | 0.298 | VL | 92.7 |
| RS1 [mm] | ∞ | 8.167 | ΣCTi/ΣATi | 2.15 |
| ft [mm] | ∞ | 27.22 | TLi [mm] | 4.799 |
| CTL [mm] | 0.250 | 0.298 | SDi/TDi | 0.89 |
| Dt [mm] | 0.550 | 0.598 | |RLr1r|/TDi | 0.35 |
| TDi/BL | 3.48 | 3.48 | fmax/fmin | 1.18 |
| TDi/Dt | 6.78 | 6.23 | LNi | 5 |

TABLE 15-continued

5th Embodiment

| | Mode 1 | Mode 2 | | |
|---|---|---|---|---|
| TDi/f | 0.96 | 1.13 | TDi/YCLr1r | 3.03 |
| TDi/ImgH | 1.14 | 1.14 | — | — |
| TL [mm] | 5.389 | 5.437 | — | — |
| TLi/EPD | 2.23 | 2.17 | — | — |
| TLi/f | 1.23 | 1.45 | — | — |
| |f/ft| | 0.00 | 0.12 | — | — |
| CRA [deg.] | 35.3 | 35.3 | — | — |
| ImgH/BL | 3.04 | 3.04 | — | — |
| YLr1r/YLf1f | 2.33 | 2.24 | — | — |

6th Embodiment

Figure 6:
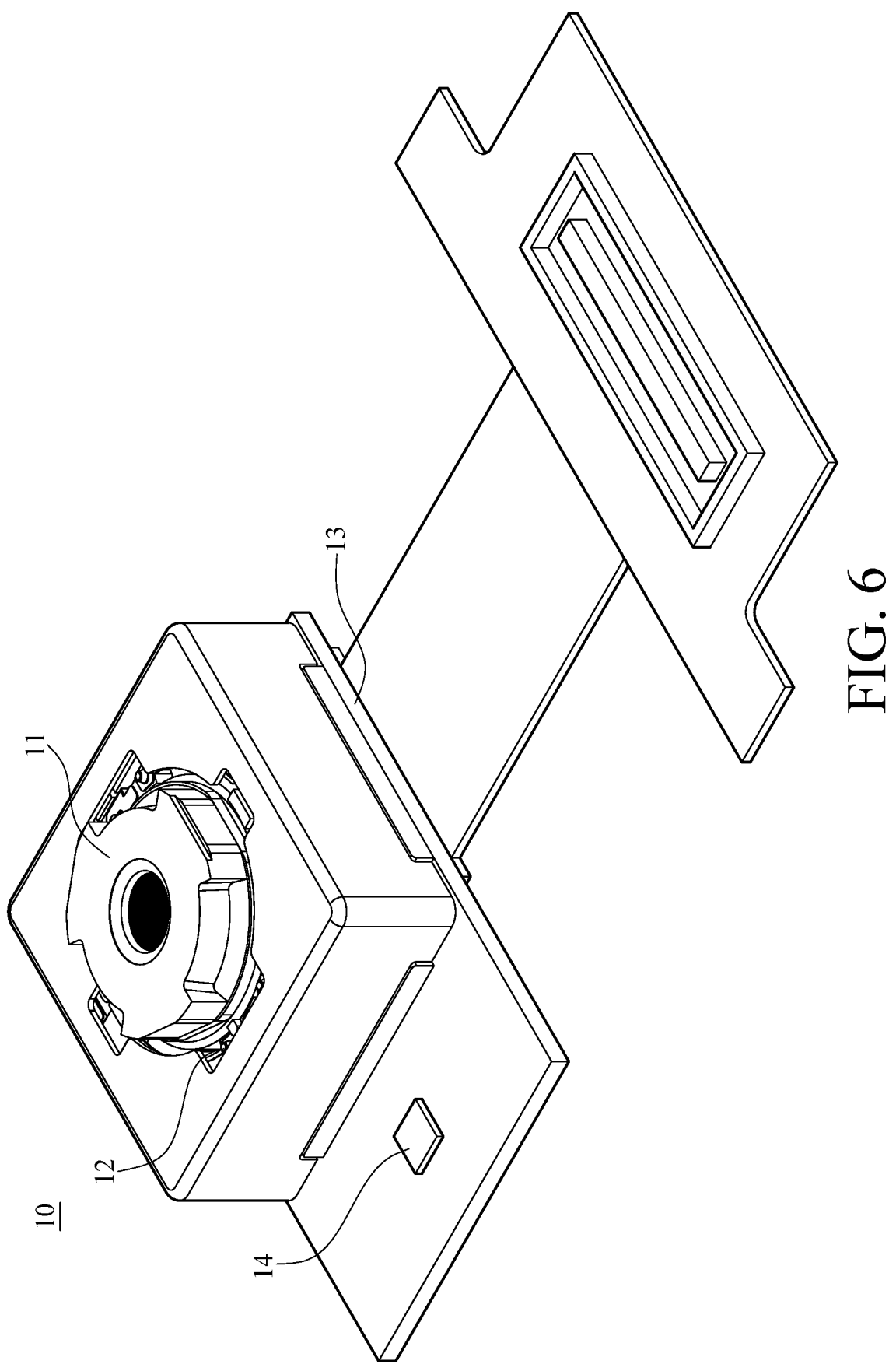
FIG. 6 is a perspective view of an image capturing unit according to the 6th embodiment of the present disclosure.

FIG. 6 is a perspective view of an image capturing unit according to the 6th embodiment of the present disclosure. In this embodiment, an image capturing unit 10 is a camera module including a lens unit 11, a driving device 12, an image sensor 13 and an image stabilizer 14. The lens unit 11 includes the optical photographing lens assembly disclosed in the 1st embodiment, a barrel and a holder member (their reference numerals are omitted) for holding the optical photographing lens assembly. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the optical photographing lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

7th Embodiment

Figure 7:
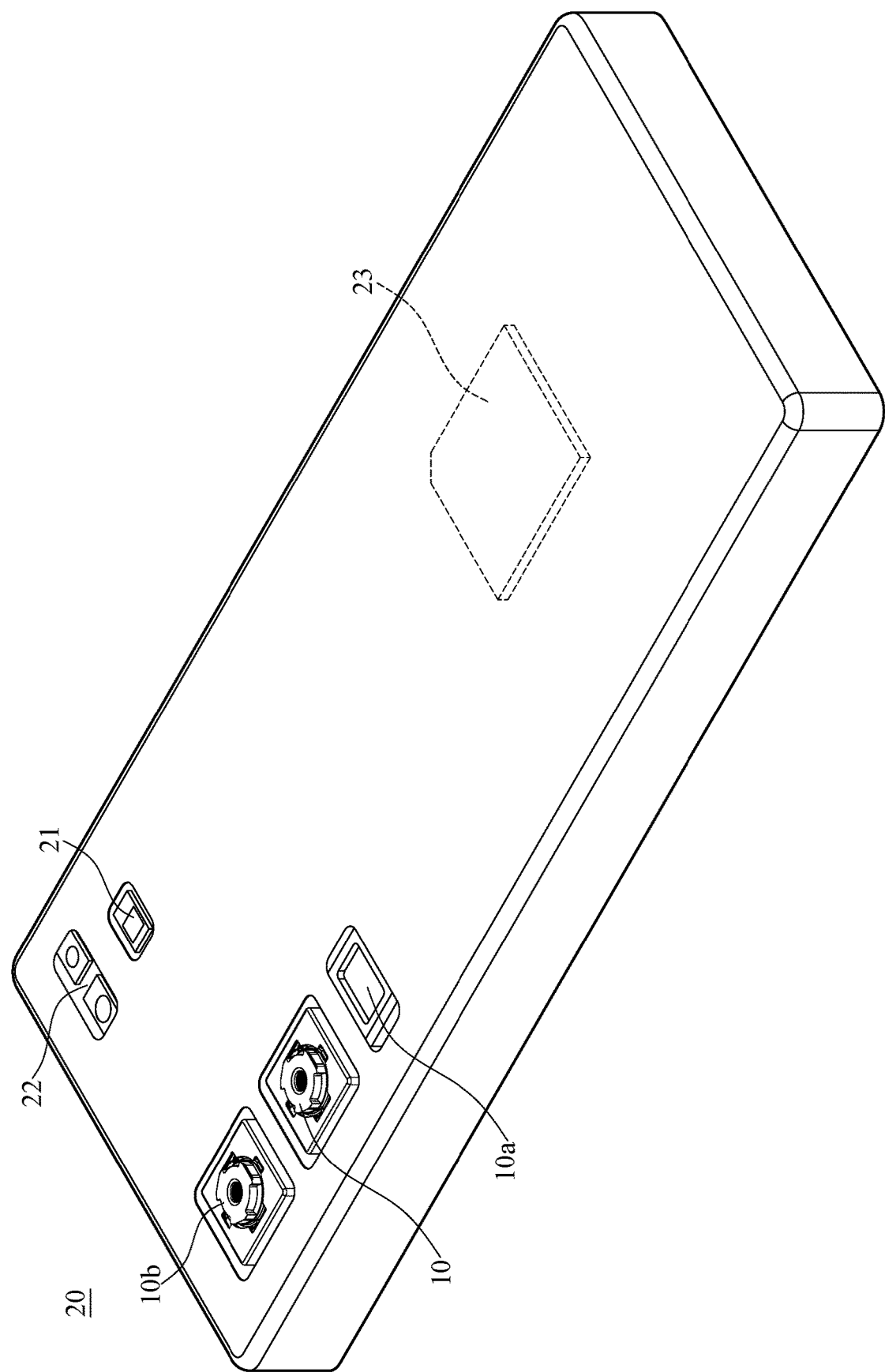
FIG. 7 is one perspective view of an electronic device according to the 7th embodiment of the present disclosure.
Figure 8:
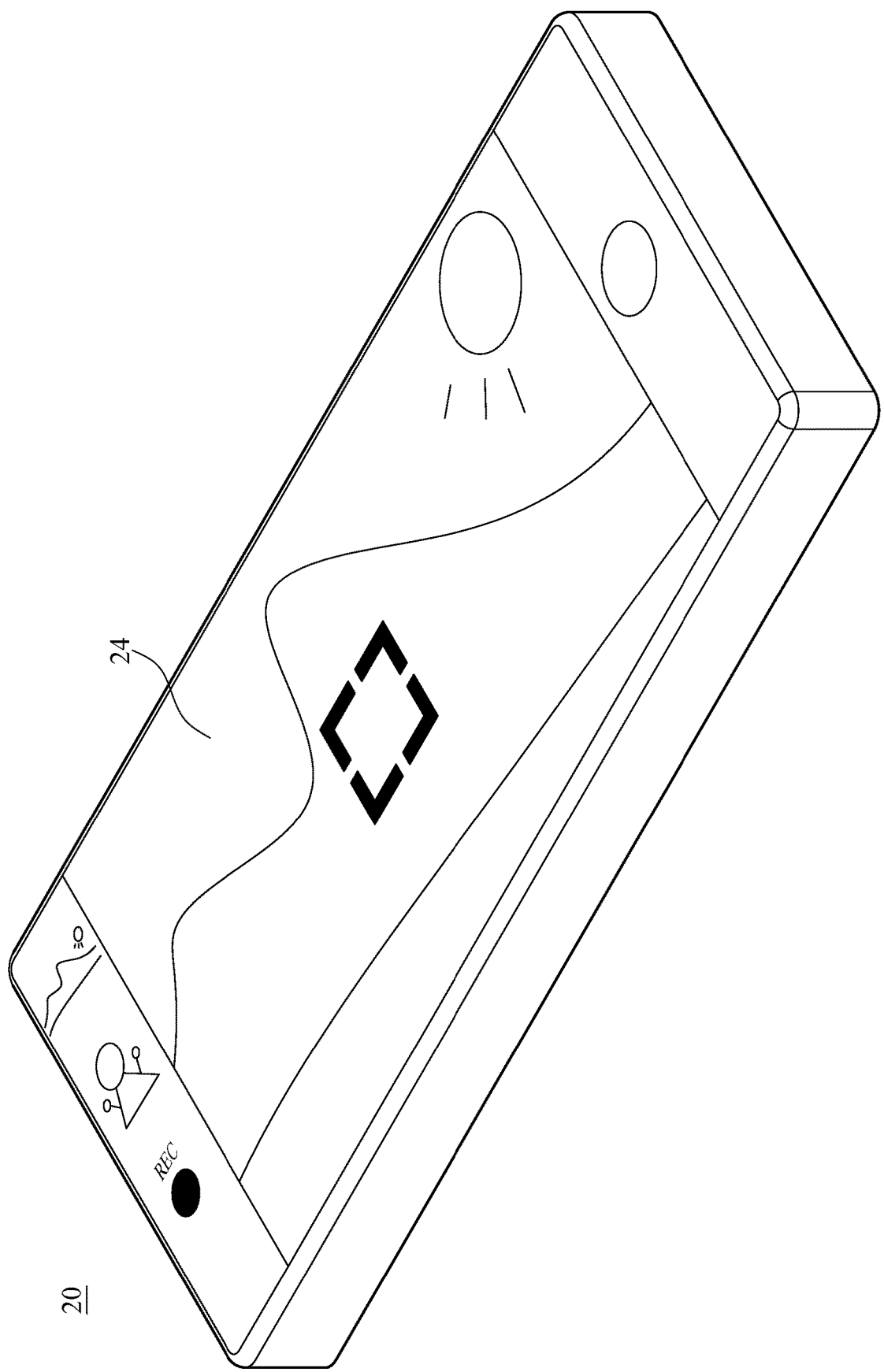
FIG. 8 is another perspective view of the electronic device in FIG. 7.
Figure 9:
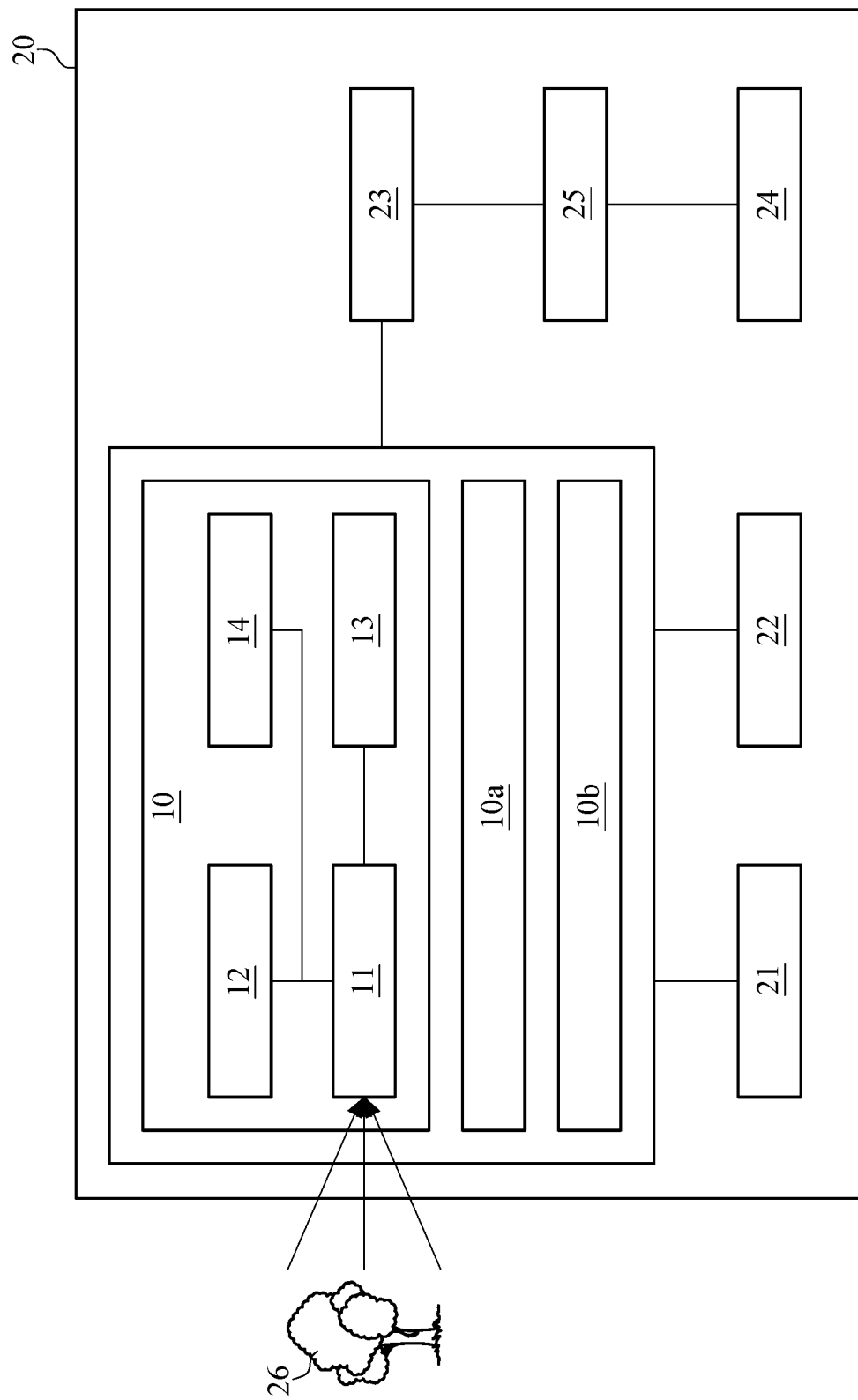
FIG. 9 is a block diagram of the electronic device in FIG. 7.

FIG. 7 is one perspective view of an electronic device according to the 7th embodiment of the present disclosure. FIG. 8 is another perspective view of the electronic device in FIG. 7. FIG. 9 is a block diagram of the electronic device in FIG. 7.

In this embodiment, an electronic device 20 is a smartphone including the image capturing unit 10 disclosed in the 6th embodiment, an image capturing unit 10a, an image capturing unit 10b, a flash module 21, a focus assist module 22, an image signal processor 23, a user interface 24 and an image software processor 25. The image capturing unit 10, the image capturing unit 10a and the image capturing unit 10b all face the same direction, and each of the image capturing units 10, 10a and 10b has a single focal point. Furthermore, the image capturing unit 10a and the image capturing unit 10b both have a configuration similar to that of the image capturing unit 10. In detail, each of the image capturing unit 10a and the image capturing unit 10b includes a lens unit, a driving device, an image sensor and an image stabilizer, and the lens unit includes a lens assembly, a barrel and a holder member for holding the lens assembly.

In this embodiment, the image capturing units 10, 10a and 10b have different fields of view (e.g., the image capturing unit 10a is a telephoto image capturing unit, the image capturing unit 10b is a wide-angle image capturing unit and the image capturing unit 10 has a maximum field of view ranging between that of the image capturing unit 10a and that of the image capturing unit 10b), such that the electronic device 20 has various magnification ratios so as to meet the requirement of optical zoom functionality. In this embodiment, the electronic device 20 includes multiple image capturing units 10, 10a and 10b, but the present disclosure is not limited to the number and arrangement of image capturing units.

When a user captures images of an object 26, the light rays converge in the image capturing unit 10, the image capturing unit 10a or the image capturing unit 10b to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the optical photographing lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-15 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing lens assembly, comprising:
   a focus tunable component; and
   an imaging lens system comprising, in order from an object side to an image side, a first lens group and a second lens group, wherein the first lens group comprises, in order from the object side to the image side, an object-side first lens element and an object-side second lens element, the second lens group comprises, in order from the image side to the object side, an image-side first lens element and an image-side second lens element, and each of all lens elements in the imaging lens system has an object-side surface facing toward the object side and an image-side surface facing toward the image side;
   wherein at least one lens surface of at least one lens element in the imaging lens system is aspheric and has at least one inflection point, the imaging lens system has a total of at least four lens elements, the lens elements of the first lens group are closer to the object side than other lens elements in the imaging lens system, and the lens elements of the second lens group are closer to the image side than other lens elements in the imaging lens system;
   wherein a maximum focal length of the optical photographing lens assembly is fmax, a minimum focal length of the optical photographing lens assembly is fmin, a maximum image height of the optical photographing lens assembly is ImgH, an axial distance between the image-side surface of the image-side first lens element and an image surface is BL, and the following conditions are satisfied:

$1.15 < fmax/fmin$; and $3.04 \leq ImgH/BL$.

2. The optical photographing lens assembly of claim 1, wherein the imaging lens system has a total of at least five lens elements, the maximum focal length of the optical photographing lens assembly is fmax, the minimum focal length of the optical photographing lens assembly is fmin, and the following condition is satisfied:

$1.30 < fmax/fmin$.

3. The optical photographing lens assembly of claim 1, wherein in at least one mode of the optical photographing lens assembly, a focal length of the optical photographing lens assembly is f, a focal length of the focus tunable component is ft, and the following conditions are satisfied:

0.10<|f/ft|; and

|ft|<30.0 [mm].

4. The optical photographing lens assembly of claim 1, wherein a maximum value among refractive indices of all lens elements in the imaging lens system is Nimax, a minimum value among Abbe numbers of all lens elements in the imaging lens system is Vimin, and the following conditions are satisfied:

1.66<Nimax<1.75; and 10.0<Vimin<20.0.

5. The optical photographing lens assembly of claim 1, wherein a sum of central thicknesses of all lens elements in the imaging lens system is ΣCTi, a sum of axial distances between each of all adjacent lens elements in the imaging lens system is ΣATi, a chief ray angle at a maximum image height position of the optical photographing lens assembly is CRA, the maximum image height of the optical photographing lens assembly is ImgH, the axial distance between the image-side surface of the image-side first lens element and the image surface is BL, and the following conditions are satisfied:

1.5<ΣCTi/ΣATi<3.0;

30.0 [deg.]<CRA<45.0 [deg.]; and 4.0<ImgH/BL<10.0.

6. The optical photographing lens assembly of claim 1, wherein a central thickness of the focus tunable component is Dt, an axial distance between the object-side surface of the object-side first lens element and the image-side surface of the image-side first lens element is TDi, a focal length of the optical photographing lens assembly is f, and the following conditions are satisfied:

0.10 [mm]<Dt<2.00 [mm];

2.40<TDi/Dt<30.0; and 0.50<TDi/f<2.0.

7. The optical photographing lens assembly of claim 1, wherein an axial distance between the object-side surface of the object-side first lens element and the image surface is TLi, an entrance pupil diameter of the optical photographing lens assembly is EPD, and the following conditions are satisfied:

3.5 [mm]<TLi<10.0 [mm]; and 1.0<TLi/EPD<3.0;

wherein in at least one mode of the optical photographing lens assembly, a focal length of the optical photographing lens assembly is f, and the following conditions are satisfied:

1.1<TLi/f<1.5; and 5.0 [mm]<f

8. The optical photographing lens assembly of claim 1, wherein the object-side first lens element has positive refractive power, the object-side surface of the object-side first lens element is convex in a paraxial region thereof, and the object-side second lens element has negative refractive power.

9. The optical photographing lens assembly of claim 1, wherein the image-side first lens element has negative refractive power, the image-side surface of the image-side first lens element is concave in a paraxial region thereof, a curvature radius of the image-side surface of the image-side first lens element is RLr1r, an axial distance between the object-side surface of the object-side first lens element and the image-side surface of the image-side first lens element is TDi, and the following condition is satisfied:

0.10<|RLr1r|/TDi<1.0.

10. The optical photographing lens assembly of claim 1, wherein at least one lens surface of each of at least three lens elements in the imaging lens system is aspheric and has at least one inflection point, and the image-side second lens element has at least one critical point in an off-axis region thereof.

11. The optical photographing lens assembly of claim 1, wherein the focus tunable component is located on the object side of the imaging lens system, the focus tunable component comprises at least one liquid lens set, and the at least one liquid lens set comprises at least one liquid material and at least one transparent substrate.

12. The optical photographing lens assembly of claim 11, wherein a refractive index of the at least one liquid material is NL, an Abbe number of the at least one liquid material is VL, and the following conditions are satisfied:

1.2<NL<1.6; and 25.0<VL<110.0.

13. An image capturing unit, comprising:
the optical photographing lens assembly of claim 1; and
an image sensor disposed on the image surface of the optical photographing lens assembly.

14. An electronic device, comprising:
the image capturing unit of claim 13.

15. An optical photographing lens assembly, comprising:
a focus tunable component comprising at least one liquid lens set, and the at least one liquid lens set comprising at least two liquid materials and at least one transparent substrate; and
an imaging lens system comprising, in order from an object side to an image side, a first lens group and a second lens group, wherein the first lens group comprises, in order from the object side to the image side, an object-side first lens element and an object-side second lens element, the second lens group comprises, in order from the image side to the object side, an image-side first lens element and an image-side second lens element, and each of all lens elements in the imaging lens system has an object-side surface facing toward the object side and an image-side surface facing toward the image side;
wherein the focus tunable component is located on the object side of the imaging lens system, at least one lens surface of at least one lens element in the imaging lens system is aspheric and has at least one inflection point, the imaging lens system has a total of at least four lens elements, the lens elements of the first lens group are closer to the object side than other lens elements in the imaging lens system, and the lens elements of the second lens group are closer to the image side than other lens elements in the imaging lens system;

wherein in at least one mode of the optical photographing lens assembly, an f-number of the optical photographing lens assembly is Fno, and the following condition is satisfied:

0.50<Fno<2.5.

16. The optical photographing lens assembly of claim 15, wherein the imaging lens system has a total of at least six lens elements, a maximum focal length of the optical photographing lens assembly is fmax, a minimum focal length of the optical photographing lens assembly is fmin, and the following condition is satisfied:

1.45<fmax/fmin.

17. The optical photographing lens assembly of claim 16, wherein one lens element having a lowest Abbe number and one lens element having a highest refractive index among all lens elements in the imaging lens system are made of a same material, the same material is plastic material, a minimum value among Abbe numbers of all lens elements in the imaging lens system is Vimin, a maximum value among refractive indices of all lens elements in the imaging lens system is Nimax, and the following condition is satisfied:

5.0<Vimin/Nimax<12.0.

18. The optical photographing lens assembly of claim 16, wherein half of a maximum field of view of the optical photographing lens assembly is HFOV, a maximum effective radius of the object-side surface of the object-side first lens element is YLf1f, a maximum effective radius of the image-side surface of the image-side first lens element is YLr1r, and the following conditions are satisfied:

30.0 [deg.]<HFOV<55.0 [deg.]; and 1.50<YLr1r/YLf1f<5.00;

wherein in at least one mode of the optical photographing lens assembly, the f-number of the optical photographing lens assembly is Fno, and the following condition is satisfied:

0.80<Fno<2.0.

19. The optical photographing lens assembly of claim 16, further comprising an aperture stop, wherein the aperture stop is disposed between the object-side first lens element and an imaged object, an axial distance between the aperture stop and the image-side surface of the image-side first lens element is SDi, an axial distance between the object-side surface of the object-side first lens element and the image-side surface of the image-side first lens element is TDi, and the following condition is satisfied:

0.80<SDi/TDi<1.0;

wherein at least one lens surface of each of at least three lens elements in the imaging lens system is aspheric and has at least one inflection point.

20. The optical photographing lens assembly of claim 16, wherein an axial distance between a surface of the optical photographing lens assembly closest to the object side and an image surface is TL, and the following condition is satisfied:

5.0 [mm]<TL<15.0 [mm];

wherein the at least two liquid materials comprises a first liquid material and a second liquid material, a central thickness of one of the first liquid material and the second liquid material is CTL, an axial distance between the first liquid material and the second liquid material is DL, and at least one of the first liquid material and the second liquid material in at least one mode of the optical photographing lens assembly satisfies the following condition:

0.20<CTL/DL<5.0.

21. The optical photographing lens assembly of claim 15, wherein in at least one mode of the optical photographing lens assembly, a focal length of the optical photographing lens assembly is f, a focal length of the focus tunable component is ft, and the following condition is satisfied:

0.20<|f/ft|.

22. The optical photographing lens assembly of claim 21, wherein at least one lens surface of at least one lens element of the second lens group is aspheric and has at least one inflection point, an axial distance between the object-side surface of the object-side first lens element and the image-side surface of the image-side first lens element is TDi, an axial distance between the image-side surface of the image-side first lens element and an image surface is BL, a maximum image height of the optical photographing lens assembly is ImgH, and the following conditions are satisfied:

3.30<TDi/BL<25.0; and 0.50<TDi/ImgH<1.6.

23. The optical photographing lens assembly of claim 21, wherein the image-side surface of the image-side first lens element is concave in a paraxial region thereof, an axial distance between the object-side surface of the object-side first lens element and the image-side surface of the image-side first lens element is TDi, a vertical distance between a non-axial critical point on the image-side surface of the image-side first lens element and an optical axis is YCLr1r, and the image-side surface of the image-side first lens element has at least one critical point in an off-axis region thereof satisfying the following condition:

1.0<TDi/YCLr1r<20.

24. The optical photographing lens assembly of claim 21, wherein the at least one transparent substrate is made of glass material, the at least two liquid materials comprise a first liquid material and a second liquid material, the first liquid material and the second liquid material are of a same material, a central thickness of one of the first liquid material and the second liquid material is CTL, and the following condition is satisfied:

0.05 [mm]<CTL<1.00 [mm].

* * * * *